(12) United States Patent
Lussier et al.

(10) Patent No.: US 12,291,287 B2
(45) Date of Patent: May 6, 2025

(54) TRACK DEVICE FOR MOVEMENT OF A VEHICLE

(71) Applicant: CAMSO INC., Magog (CA)

(72) Inventors: Alain Lussier, St-Francois Xavier-de-Brompton (CA); Jeremie Zuchoski, Sherbrooke (CA); Olivier Ravat, Magog (CA)

(73) Assignee: Camso Inc., Magog (CA)

( * ) Notice: Subject to any disclaimer, the term of this patent is extended or adjusted under 35 U.S.C. 154(b) by 987 days.

(21) Appl. No.: 16/759,706

(22) PCT Filed: Oct. 25, 2018

(86) PCT No.: PCT/CA2018/051354
§ 371 (c)(1),
(2) Date: Apr. 27, 2020

(87) PCT Pub. No.: WO2019/079901
PCT Pub. Date: May 2, 2019

(65) Prior Publication Data
US 2020/0296876 A1 Sep. 24, 2020

Related U.S. Application Data

(60) Provisional application No. 62/577,022, filed on Oct. 25, 2017.

(51) Int. Cl.
*B62D 49/06* (2006.01)
*A01B 51/02* (2006.01)
(Continued)

(52) U.S. Cl.
CPC .......... *B62D 49/0635* (2013.01); *A01B 51/02* (2013.01); *B62D 55/02* (2013.01); *B62D 55/06* (2013.01); *B62D 55/084* (2013.01)

(58) Field of Classification Search
CPC .... B62D 49/0635; B62D 55/02; B62D 55/04; B62D 55/06; B62D 55/084; A01B 51/02;
(Continued)

(56) References Cited

U.S. PATENT DOCUMENTS

| 1,413,100 A | * | 4/1922 | Cox | .......................... B60P 3/42 |
| | | | | 180/53.6 |
| 1,769,074 A | * | 7/1930 | Ruatti | ..................... E02F 9/024 |
| | | | | 180/9.3 |

(Continued)

FOREIGN PATENT DOCUMENTS

| CA | 2241479 | 2/2000 |
| WO | 2017007396 | 1/2017 |
| WO | 2019079901 | 5/2019 |

OTHER PUBLICATIONS

International Search Report issued on Feb. 20, 2019 in connection with PCT Patent application on. PCT/CA2018/051354, 3 pages.
(Continued)

*Primary Examiner* — Anne Marie M Boehler
(74) *Attorney, Agent, or Firm* — Hahn Loeser & Parks LLP

(57) ABSTRACT

An auxiliary track device for movement of a vehicle. The auxiliary track device may enhance traction and/or floatation of the vehicle, such as, for example, by being installable on the vehicle to convert the vehicle into a tracked one and/or by being deployable to engage the ground in certain situations, including where additional traction and/or floatation may be desirable based on an environment of the vehicle such as one or more characteristics of the ground (e.g., a compliance, such as a softness or hardness, a slipperiness, a soil compatibility, and/or a profile of the ground), a state of the vehicle (e.g., a speed of the vehicle, loading carried by the vehicle, etc.), a user's preferences (e.g., ride quality, etc.), and/or any other suitable factor. The auxiliary track
(Continued)

device may be used only for traction and/or floatation of the vehicle or may be part of an implement to perform work with the vehicle.

18 Claims, 31 Drawing Sheets

(51) Int. Cl.
  *B62D 55/02* (2006.01)
  *B62D 55/06* (2006.01)
  *B62D 55/084* (2006.01)
(58) Field of Classification Search
  CPC ........ B60K 17/28; B60K 25/06; B60K 25/08; B60K 35/06
  USPC ......... 180/9.34, 14.2, 14.3, 14.4, 53.3, 53.4, 180/14.7, 53.5, 53.6; 280/408, 410
  See application file for complete search history.

(56) References Cited

U.S. PATENT DOCUMENTS

| | | | | |
|---|---|---|---|---|
| 2,750,166 A * | 6/1956 | Polak | ................. | E01C 19/46 180/53.6 |
| 2,986,827 A * | 6/1961 | Peterson | ................. | E02F 9/003 172/705 |
| 3,266,816 A * | 8/1966 | Peterson | ................. | E02F 9/003 172/699 |
| 3,451,494 A * | 6/1969 | Kowalik | ............ | B62D 55/0655 180/14.1 |
| 3,526,290 A | 9/1970 | Caudill | | |
| 3,650,343 A * | 3/1972 | Helsell | ................. | B62D 55/06 37/219 |
| 3,815,683 A * | 6/1974 | Collin, Jr. | ............. | A01B 13/08 172/699 |
| 4,174,757 A * | 11/1979 | Stedman | ............ | B62D 55/0655 180/9.46 |
| 4,340,127 A * | 7/1982 | Broberg | ................. | E02F 9/166 180/327 |
| 4,410,219 A * | 10/1983 | van der Lely | ......... | B62D 55/24 305/180 |
| 4,500,105 A * | 2/1985 | Machnee | ................. | B60D 1/42 280/468 |
| 4,541,498 A | 9/1985 | Pitchford | | |
| 4,657,099 A | 4/1987 | Baltensperger et al. | | |
| 4,821,824 A * | 4/1989 | Gilbert | .................. | B62D 55/02 305/120 |
| 5,680,715 A * | 10/1997 | Thiboutot | ................. | E01H 4/02 37/219 |
| 8,528,657 B1 * | 9/2013 | Rosenboom | ........... | A01C 7/208 172/311 |
| 8,626,408 B1 * | 1/2014 | Satzler | ................. | A01B 69/003 701/50 |
| 2006/0254833 A1 * | 11/2006 | Grobler | .............. | B62D 49/0635 180/9.34 |
| 2006/0266576 A1 * | 11/2006 | Eckhoff | ............... | B62D 57/028 221/231 |
| 2010/0037712 A1 * | 2/2010 | Burton | .................... | E21B 49/02 53/284.7 |
| 2015/0105965 A1 * | 4/2015 | Blackwell | .............. | A01B 79/00 701/28 |
| 2015/0274227 A1 * | 10/2015 | Aljahmi | ................. | B62D 61/12 180/9.3 |
| 2015/0321708 A1 * | 11/2015 | Van Mill | .............. | B62D 55/104 280/28.5 |
| 2017/0188505 A1 * | 7/2017 | Potier | .................. | G05D 1/0221 |
| 2017/0238456 A1 * | 8/2017 | Boulard | ................. | A01B 79/00 |
| 2017/0247068 A1 * | 8/2017 | Ratgen | ............... | B62D 49/0635 |
| 2019/0150351 A1 * | 5/2019 | Bauer | .................. | A01B 63/112 |
| 2020/0190749 A1 * | 6/2020 | Meier | .................. | E01C 19/266 |
| 2020/0370250 A1 * | 11/2020 | Schlessel | ............... | E01C 19/43 |
| 2021/0212249 A1 * | 7/2021 | Disberger | ........... | A01B 59/064 |

OTHER PUBLICATIONS

Written Opinion issued on Feb. 20, 2019 in connection with PCT Patent application on. PCT/CA2018/051354, 4 pages.

* cited by examiner

TRACK DEVICE FOR MOVEMENT OF A VEHICLE

CROSS-REFERENCE TO RELATED APPLICATION

This application is a national stage of International Application PCT/CA2018/051354 filed on Oct. 25, 2018 and claiming priority from U.S. Provisional Application 62/577,022 filed on Oct. 25, 2017, all of which are incorporated by reference herein.

FIELD

This disclosure relates generally to vehicles and, more particularly, to track devices for movement of vehicles.

BACKGROUND

Certain vehicles, including industrial vehicles such as agricultural vehicles (e.g., tractors, harvesters, combines, etc.), construction vehicles (e.g., loaders, excavators, bulldozers, etc.), and forestry vehicles (e.g., feller-bunchers, tree chippers, knuckleboom loaders, etc.), and military vehicles (e.g., military trucks, etc.), for example, are often equipped with ground-engaging wheels which may sometimes detrimentally affect their performance on soft, slippery and/or irregular grounds (e.g., soil, mud, sand, ice, snow, etc.) on which they may operate.

Some vehicles may be equipped with track systems to enhance their traction and/or floatation in off-road environments. For instance, some vehicles may be originally designed and manufactured with track systems, while other vehicles may have ground-engaging wheels that are replaced by track systems.

Although they are useful, track systems may be used less or be less readily available in some situations. For example, in some cases, track systems may be desirable under certain conditions (e.g., ground conditions) but not in other conditions. Also, in some cases, costs and/or installation times for track systems may discourage their use with certain vehicles.

For these and other reasons, there is a need to improve track technology for vehicles.

SUMMARY

In accordance with various aspects, this disclosure relates to an auxiliary track device for movement of a vehicle. The auxiliary track device may enhance traction and/or floatation of the vehicle, such as, for example, by being installable on the vehicle to convert the vehicle into a tracked one and/or by being deployable to engage the ground in certain situations, including where additional traction and/or floatation may be desirable based on an environment of the vehicle such as one or more characteristics of the ground (e.g., a compliance, such as a softness or hardness, a slipperiness, a soil compatibility, and/or a profile of the ground), a state of the vehicle (e.g., a speed of the vehicle, loading carried by the vehicle, etc.), a user's preferences (e.g., ride quality, etc.), and/or any other suitable factor. The auxiliary track device may be used only for traction and/or floatation of the vehicle or may be part of an implement to perform work with the vehicle.

For example, in accordance with an aspect, this disclosure relates to a track device for a vehicle. The track device includes a track system and a support for connecting the track device to the vehicle and supporting the track system. The track system includes a track for engaging the ground and a track-engaging assembly for driving and guiding the track around the track-engaging assembly. The support of the track device includes an attachment configured to be connected to a three-point hitch of the vehicle.

In accordance with another aspect, this disclosure relates to an implement for a vehicle. The implement includes a work element to perform work; a track system; and a powertrain. The track system includes a track for engaging the ground and a track-engaging assembly for driving and guiding the track around the track-engaging assembly. The track-engaging assembly includes a drive wheel for driving the track. The powertrain is configured to power the drive wheel to rotate the drive wheel.

In accordance with another aspect, this disclosure relates to a track device for a vehicle. The track device comprises a track system, a support for connecting the track device to the vehicle and supporting the track system, and a powertrain. The track system comprises a track for engaging the ground and a track-engaging assembly for driving and guiding the track around the track-engaging assembly. The track-engaging assembly comprises a drive wheel for driving the track. The powertrain is configured to power the drive wheel to rotate the drive wheel. The powertrain is configured to be connected to a power take-off of the vehicle.

These and other aspects of this disclosure will now become apparent to those of ordinary skill in the art upon review of the following description of embodiments in conjunction with the accompanying drawings.

BRIEF DESCRIPTION OF THE DRAWINGS

A detailed description of embodiments is provided below, by way of example only, with reference to the accompanying drawings, in which.

It is to be expressly understood that the description and drawings are only for purposes of illustrating certain embodiments and are an aid for understanding. They are not intended to and should not be limiting.

DETAILED DESCRIPTION OF EMBODIMENTS

Figure 1:
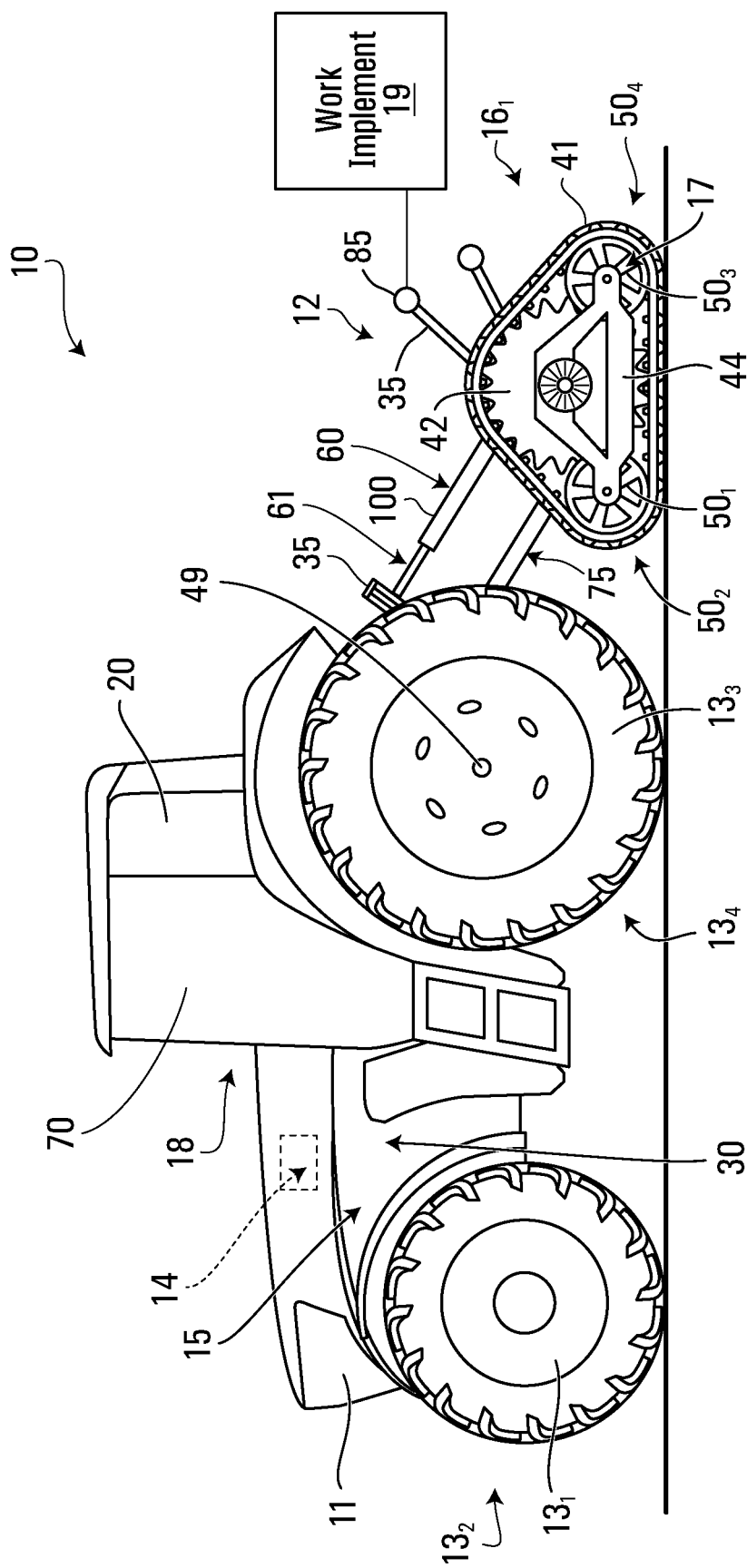
FIGS. 1 and 2 shows an example of an embodiment of a vehicle comprising an auxiliary track device.
Figure 2:
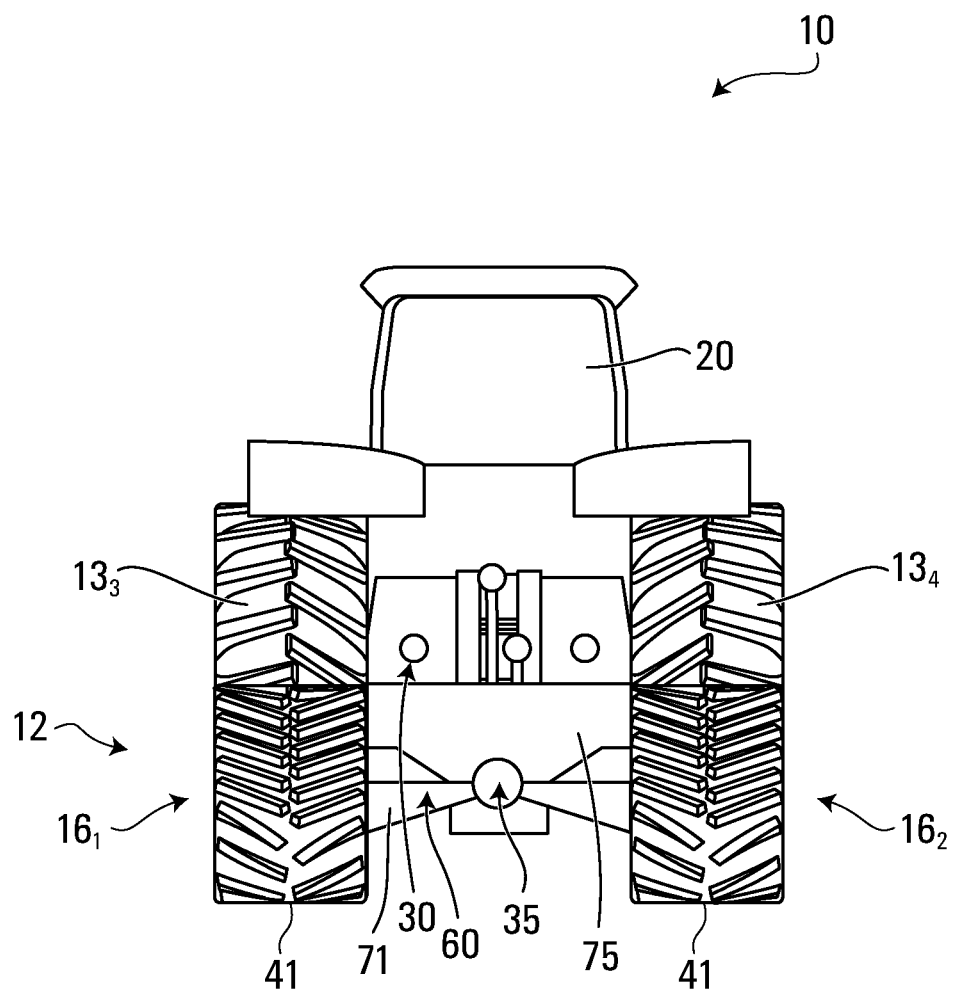

FIGS. 1 and 2 shows an example of an embodiment of a vehicle 10 comprising an auxiliary track device 12 for movement of the vehicle 10 on the ground. In this embodiment, the vehicle 10 is a heavy-duty work vehicle for performing agricultural, construction or other industrial work, or military work. More particularly, in this embodiment, the vehicle 10 is an agricultural vehicle for performing agricultural work. Specifically, in this example, the agricultural vehicle 10 is a tractor.

In this embodiment, the vehicle 10 comprises a frame 11, a powertrain 15, a steering mechanism 18, a plurality of ground-engaging wheels $13_1$-$13_4$, and an operator cabin 20 that enable a user to move the vehicle 10 on the ground and perform work using an implement 19. The vehicle 10 has a longitudinal direction, a widthwise direction and a heightwise direction.

As further discussed later, in this embodiment, the auxiliary track device 12 may enhance traction and/or floatation of the vehicle 10, such as, for example, by being installable on the vehicle 10 to convert the vehicle 10 into a tracked one and/or by being deployable to engage the ground in certain situations, including where additional traction and/or floatation may be desirable based on an environment of the vehicle 10 such as one or more characteristics of the ground (e.g., a compliance, such as a softness or hardness, a slipperiness, a soil compatibility, and/or a profile of the ground), a state of the vehicle 10 (e.g., a speed of the vehicle 10, loading carried by the vehicle 10, etc.), the user's preferences (e.g., ride quality, etc.), and/or any other suitable factor.

The powertrain 15 is configured to generate power for the vehicle 10, including motive power for the ground-engaging wheels $13_1$-$13_4$ to propel the vehicle 10 on the ground. To that end, the powertrain 15 comprises a power source 14 (e.g., a primer mover) that includes one or more motors. For example, in this embodiment, the power source 14 comprises an internal combustion engine. In other embodiments, the power source 14 may comprise another type of motor (e.g., an electric motor) or a combination of different types of motor (e.g., an internal combustion engine and an electric motor). The powertrain 15 can transmit power from the power source 14 to one or more of the ground-engaging wheels $13_1$-$13_4$ in any suitable way (e.g., via a transmission, a differential, a direct connection, and/or any other suitable mechanism).

In some embodiments, the powertrain 15 may also provide power for operation of one or more other devices, such as the implement 19 and/or the auxiliary track device 12, as further discussed later. More particularly, in this embodiment, the powertrain 15 can provide power from the power source 14 to operate a three-point hitch 35 of the vehicle 10 (e.g., via a hydraulic system 33 of the vehicle 10) and comprises a power take-off (PTO) 30 to provide power from the power source 14.

The operator cabin 20 is where the user sits and controls the vehicle 10. More particularly, the operator cabin 20 comprises a user interface 70 allowing the user to steer the vehicle 10 on the ground, operate the implement 19, and control other aspects of the vehicle 10. In this embodiment, the user interface 70 comprises input devices, such as an accelerator, a brake control, and a steering device (e.g., a steering wheel, a stick, etc.) that are operated by the user to control motion of the vehicle 10 on the ground. The user interface 70 also comprises output devices such as an instrument panel (e.g., a dashboard) which provides indicators (e.g., a speedometer indicator, a tachometer indicator, etc.) to convey information to the user. In some embodiments, the user interface 70 may also allow the user to control the auxiliary track device 12, as further discussed later.

The implement 19 is used to perform agricultural work. For example, in some embodiments, the implement 19 may include a planter, a combine head, a sprayer, a fertilizer, a tiller, a grain cart, or any other type of agricultural work implement. In this embodiment, the implement 19 is a trailed implement that is trailed behind the frame 11 of the vehicle 10.

The ground-engaging wheels $13_1$-$13_4$ engage the ground to provide traction to the vehicle 10. Each of the ground-engaging wheels $13_1$-$13_4$ is mounted to an axle of the vehicle 10 and may comprise a tire, which may be pneumatic or solid and made of rubber and/or other materials (e.g., an off-the-road (OTR) tire).

The auxiliary track device 12 is configured to engage the ground to facilitate movement of the vehicle 10 on the ground, such as by providing traction and/or floatation aid, i.e., additional traction and/or floatation to the vehicle 10 compared to if only the ground-engaging wheels $13_1$-$13_4$ were used.

In some embodiments, the auxiliary track device 12 may be installed onto the vehicle 10 to convert the vehicle 10 into a tracked one. That is, the vehicle 10 may be originally designed, manufactured and provided with only the ground-engaging wheels $13_1$-$13_4$, and the auxiliary track device 12 may be subsequently mounted to the vehicle 10 (e.g., as an aftermarket accessory). In other embodiments, the auxiliary track device 12 may be provided during original manufacturing of the vehicle 10.

In this example, the auxiliary track device 12 is selectively deployable onto and retractable from the ground based on various factors. For instance, the auxiliary track device 12 may be deployed to engage the ground in certain situations, including where additional traction and/or floatation may be desirable based on the environment of the vehicle 10 such as one or more characteristics of the ground (e.g., the compliance, such as the softness or hardness, the slipperiness, the soil compatibility, and/or the profile of the ground), the state of the vehicle 10 (e.g., the speed of the vehicle 10, the loading carried by the vehicle 10, etc.), the user's preferences (e.g., ride quality, etc.), and/or any other suitable factor. When less traction and/or floatation may be needed or desirable, the auxiliary track device 12 may be retracted such that it ceases to engage the ground.

In this embodiment, the auxiliary track device 12 comprises a plurality of track systems $16_1$,$16_2$ for engaging the ground and a support 60 for connecting the auxiliary track device 12 to the vehicle 10 and supporting the track systems $16_1$,$16_2$.

Figure 3:
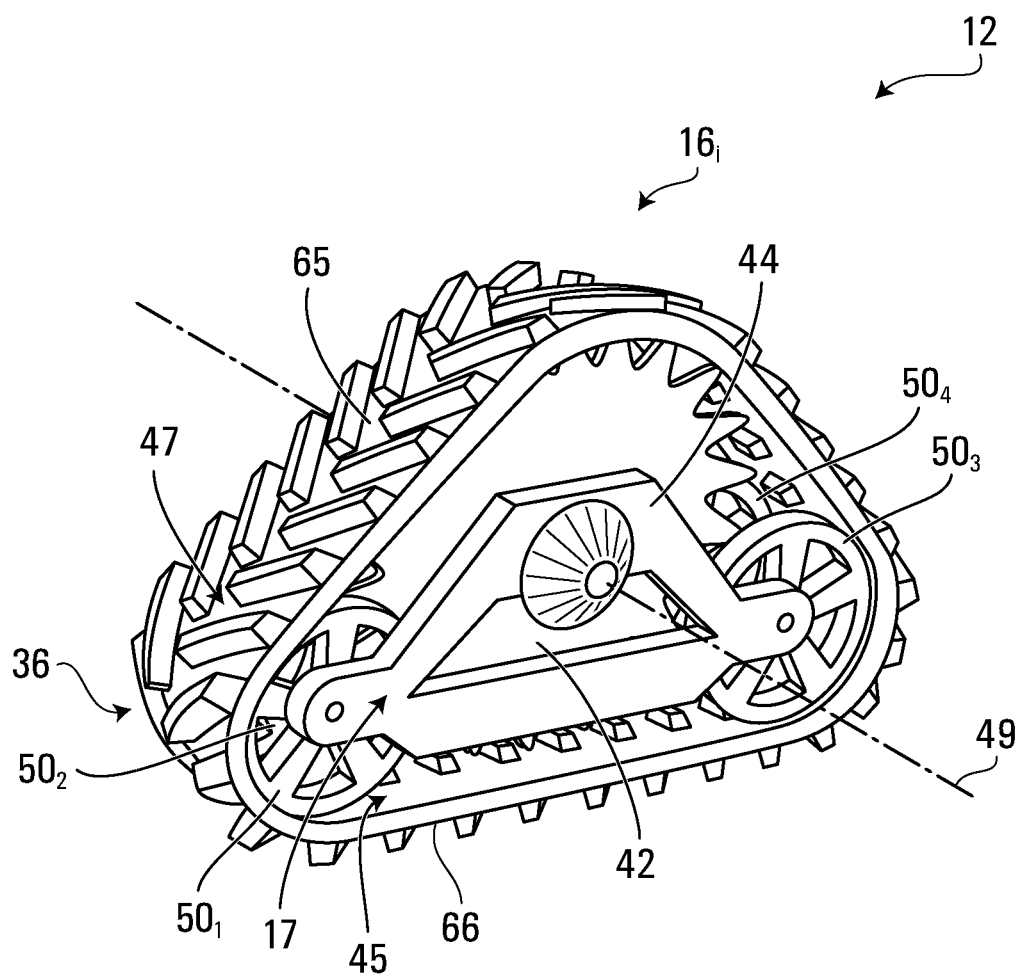
FIGS. 3 and 4 show a perspective view and a side view of a track system of the auxiliary track device.
Figure 4:
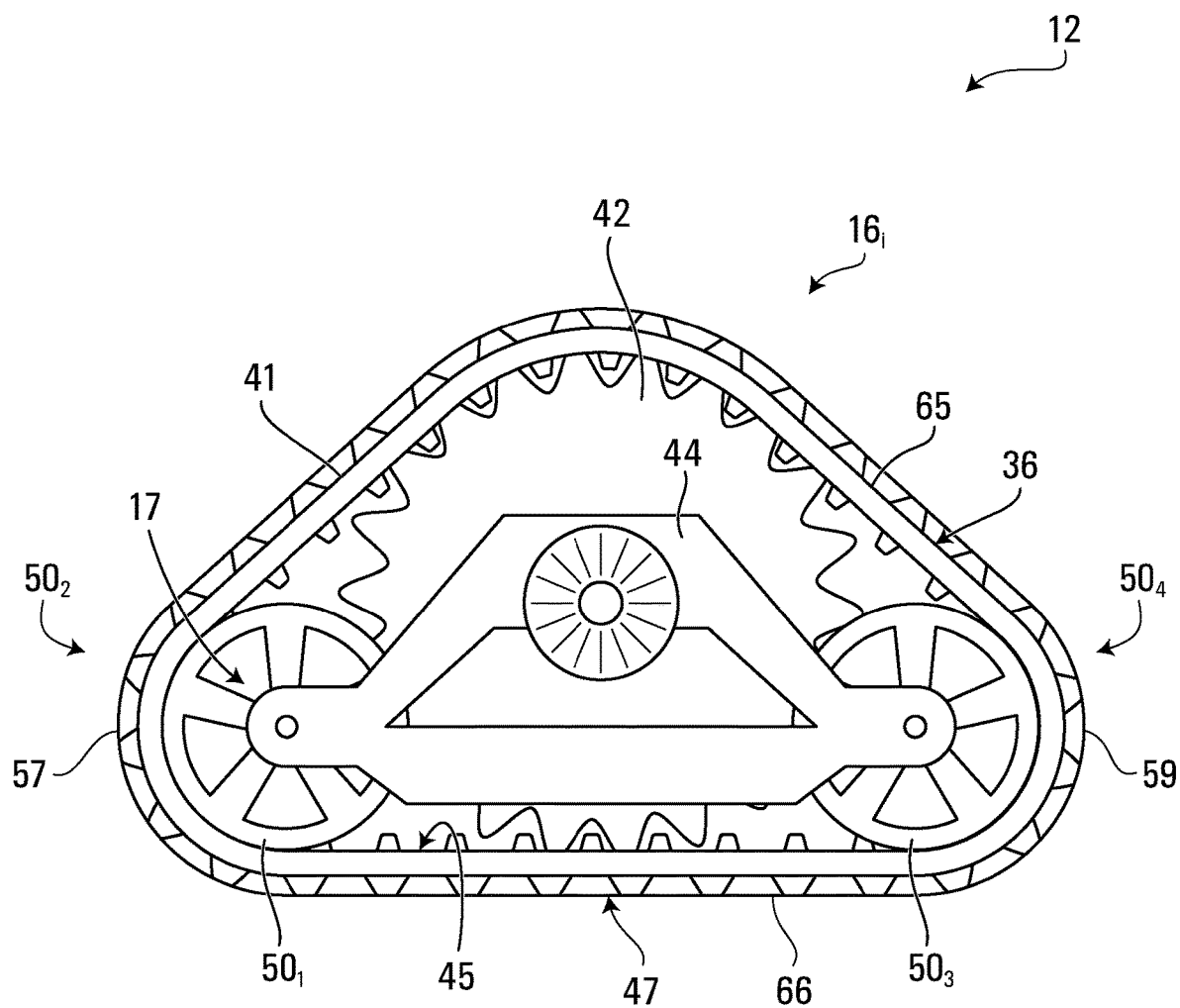
Figure 5:
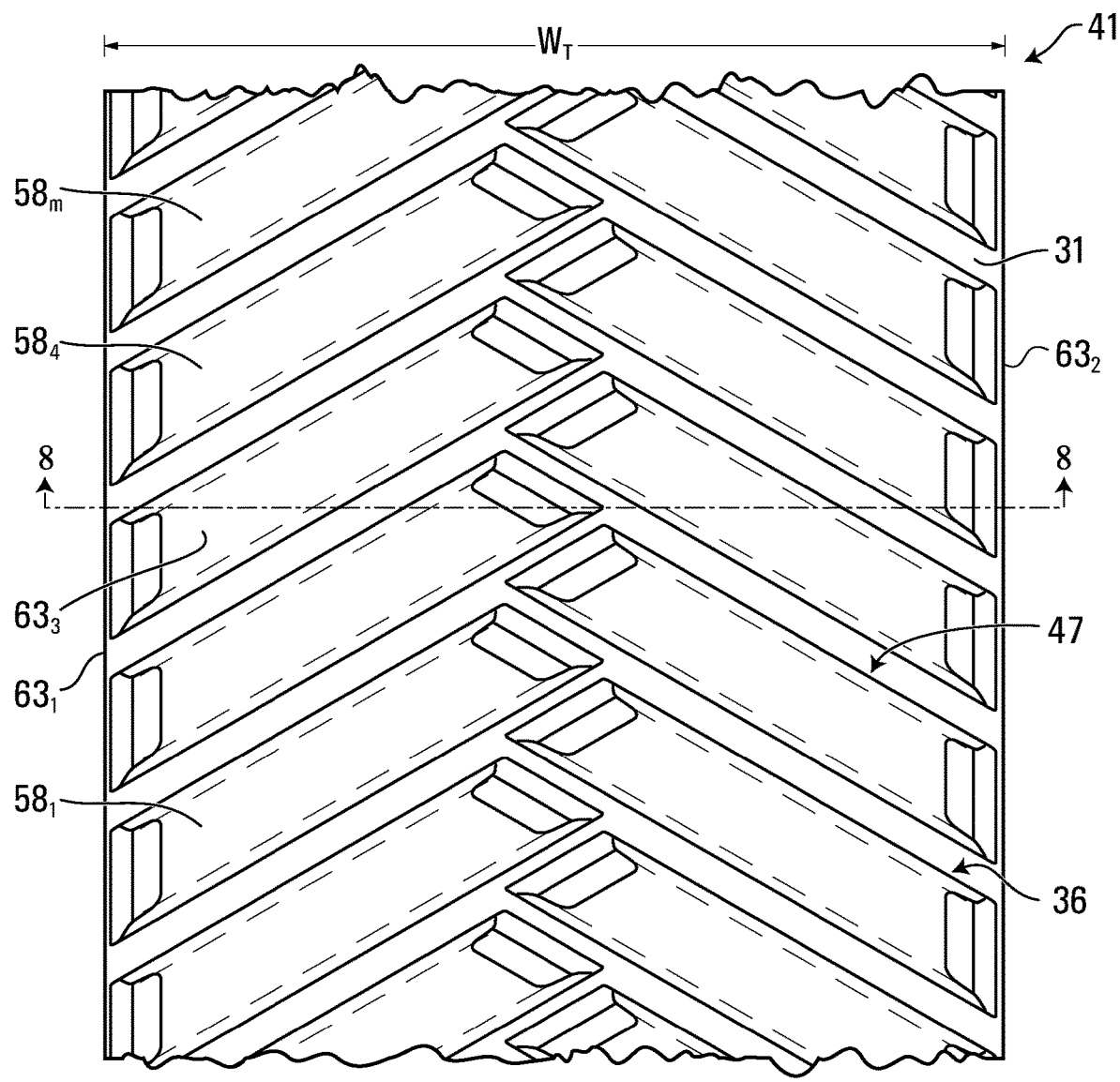
FIGS. 5 to 8 show an outer plan view, a side view, an inner plan view, and a cross-sectional view of a track of the track system.
Figure 7:
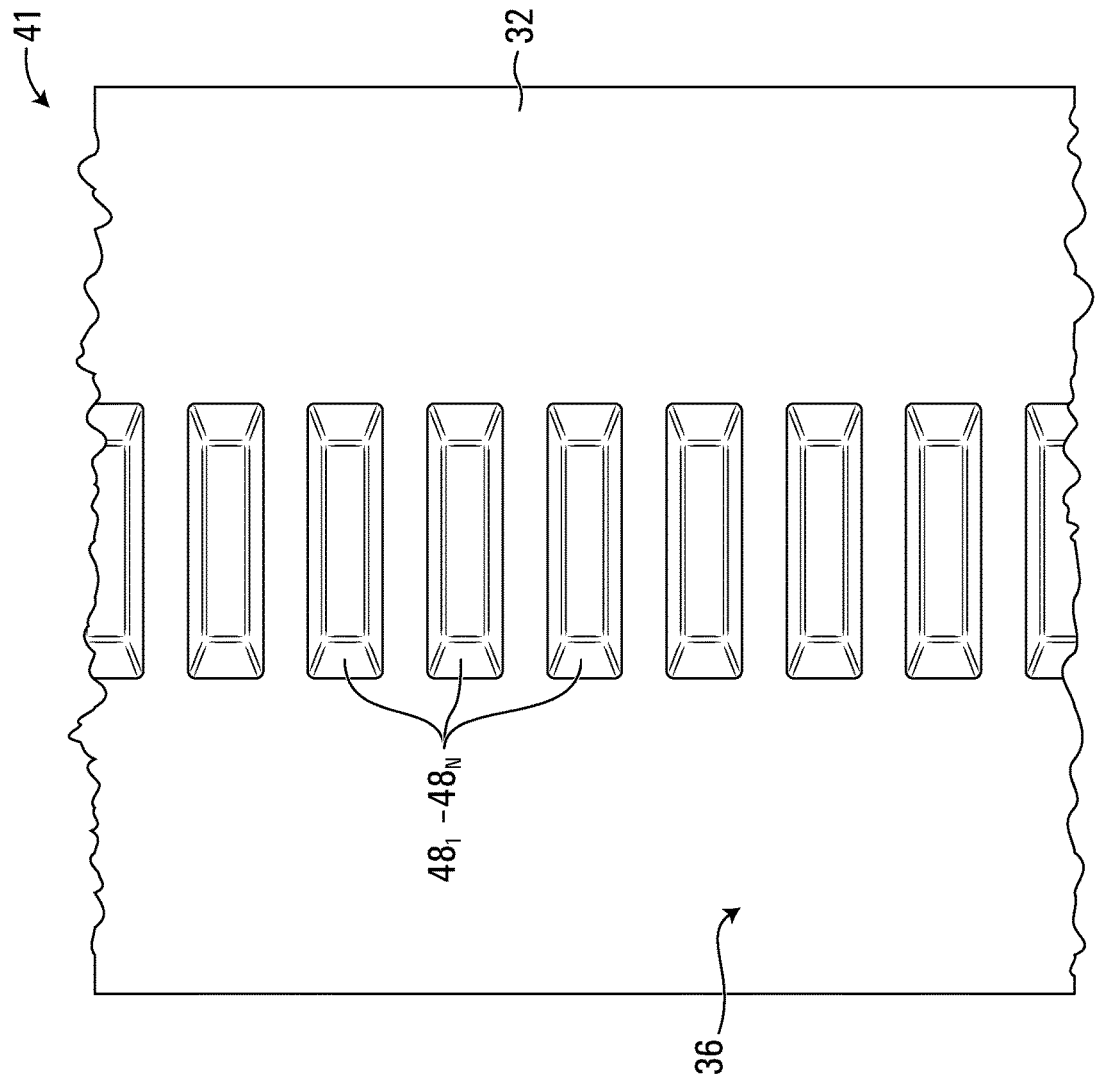
Figure 6:
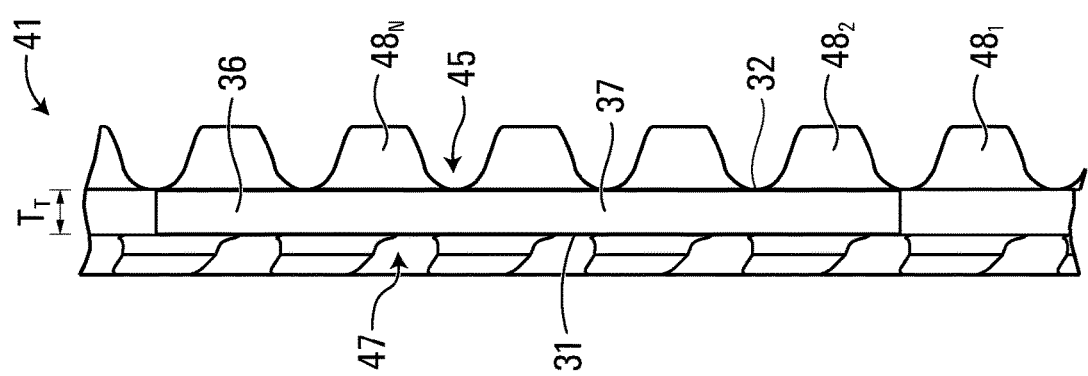
Figure 8:
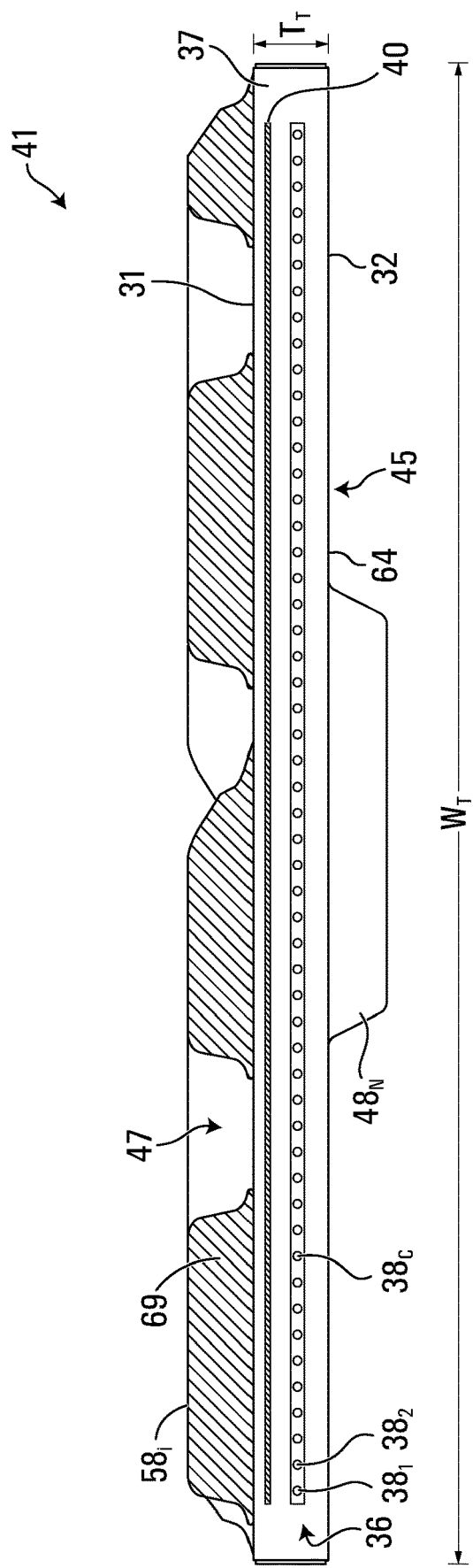

With additional reference to FIGS. 3 and 4, in this embodiment, each track system $16_i$ comprises a track-engaging assembly 17 and a track 41 disposed around the track-engaging assembly 17. In this example, the track-engaging assembly 17 comprises a frame 44 and a plurality of track-contacting wheels that includes a drive wheel 42 and a plurality of idler wheels $50_1$-$50_4$, which includes leading idler wheels $50_1$, $50_2$ and trailing idler wheels $50_3$, $50_4$. Also, in this example, the track-engaging assembly comprises a sliding surface for sliding against the track 41. The track system $16_i$ has a front longitudinal end 57 and a rear longitudinal end 59 that define a length of the track system $16_i$. A width of the track system $16_i$ is defined by a width $W_T$ of the track 41. The track system $16_i$ has a longitudinal direction, a widthwise direction, and a heightwise direction.

The track 41 engages the ground. A length of the track 41 allows the track 41 to be mounted around the track-engaging assembly 17. In view of its closed configuration without ends that allows it to be disposed and moved around the track-engaging assembly 17, the track 41 can be referred to as an "endless" track. Referring additionally to FIGS. 5 to 8, the track 41 comprises an inner side 45 facing the wheels 42, $50_1$-$50_4$ and the sliding surface of the track-engaging assembly 17 and a ground-engaging outer side 47 opposite the inner side 45 for engaging the ground. Lateral edges $63_1$, $63_2$ of the track 41 define its width $W_T$. The track 41 has a top run 65 which extends between the longitudinal ends 57, 59 of the track system $16_i$ and over the track-engaging assembly 17, and a bottom run 66 which extends between the longitudinal ends 57, 59 of the track system $16_i$ and under the track-engaging assembly 17. The track 41 has a longitudinal direction, a widthwise direction, and a thicknesswise direction.

In this embodiment, the track 41 is elastomeric, i.e., comprises elastomeric material, allowing it to flex around the wheels 42, $50_1$-$50_4$. The elastomeric material of the track 41 can include any polymeric material with suitable elasticity. In this embodiment, the elastomeric material includes rubber. Various rubber compounds may be used and, in some cases, different rubber compounds may be present in different areas of the track 41. In other embodiments, the elastomeric material of the track 41 may include another elastomer in addition to or instead of rubber (e.g., polyurethane elastomer). The track 41 can be molded into shape in a mold by a molding process during which its elastomeric material is cured.

More particularly, in this embodiment, the track 41 comprises an elastomeric belt-shaped body 36 underlying its inner side 45 and its ground-engaging outer side 47. In view of its underlying nature, the body 36 can be referred to as a "carcass". The carcass 36 comprises elastomeric material 37 which allows the track 41 to flex around the wheels 42, $50_1$-$50_4$.

In this embodiment, the carcass 36 comprises a plurality of reinforcements embedded in its elastomeric material 37. One example of a reinforcement is a layer of reinforcing cables $38_1$-$38_C$ that are adjacent to one another and that extend in the longitudinal direction of the track 41 to enhance strength in tension of the track 41 along its longitudinal direction. In some cases, a reinforcing cable may be a cord or wire rope including a plurality of strands or wires. In other cases, a reinforcing cable may be another type of cable and may be made of any material suitably flexible longitudinally (e.g., fibers or wires of metal, plastic or composite material). Another example of a reinforcement is a layer of reinforcing fabric 40. Reinforcing fabric comprises pliable material made usually by weaving, felting, or knitting natural or synthetic fibers. For instance, a layer of reinforcing fabric may comprise a ply of reinforcing woven fibers (e.g., nylon fibers or other synthetic fibers). Various other types of reinforcements may be provided in the carcass 36 in other embodiments.

The carcass 36 may be molded into shape in the track's molding process during which its elastomeric material 37 is cured. For example, in this embodiment, layers of elastomeric material providing the elastomeric material 37 of the carcass 36, the reinforcing cables $38_1$-$38_C$ and the layer of reinforcing fabric 40 may be placed into the mold and consolidated during molding.

In this embodiment, the inner side 45 of the track 41 comprises an inner surface 32 of the carcass 36 and a plurality of wheel-contacting projections $48_1$-$48_N$ that project from the inner surface 32 to contact at least some of the wheels 42, $50_1$-$50_4$ and that are used to do at least one of driving (i.e., imparting motion to) the track 41 and guiding the track 41. In that sense, the wheel-contacting projections $48_1$-$48_N$ can be referred to as "drive/guide projections", meaning that each drive/guide projection is used to do at least one of driving the track 41 and guiding the track 41. Also, such drive/guide projections are sometimes referred to as "drive/guide lugs" and will thus be referred to as such herein. More particularly, in this embodiment, the drive/guide lugs $48_1$-$48_N$ interact with the drive wheel 42 in order to cause the track 41 to be driven, and also interact with the idler wheels $50_1$-$50_4$ in order to guide the track 41 as it is driven by the drive wheel 42. The drive/guide lugs $48_1$-$48_N$ are thus used to both drive the track 41 and guide the track 41 in this embodiment.

In this example, each of the drive/guide lugs $48_1$-$48_N$ is an elastomeric drive/guide lug in that it comprises elastomeric material 68. The drive/guide lugs $48_1$-$48_N$ can be provided and connected to the carcass 36 in the mold during the track's molding process.

The ground-engaging outer side 47 of the track 41 comprises a ground-engaging outer surface 31 of the carcass 36 and a plurality of traction projections $58_1$-$58_M$ that project from the outer surface 31 and engage and may penetrate into the ground to enhance traction. The traction projections $58_1$-$58_M$, which can sometimes be referred to as "treads", "traction lugs" or "traction profiles", are spaced apart in the longitudinal direction of the track system $16_i$. The traction projections $61_1$-$61_M$ may be arranged in any suitable way.

In this example, each of the traction projections $58_1$-$58_M$ is an elastomeric traction projection in that it comprises elastomeric material 69. The traction projections $58_1$-$58_M$ can be provided and connected to the carcass 36 in the mold during the track's molding process.

The track 41 may be constructed in various other ways in other embodiments. For example, in some embodiments, the track 41 may comprise a plurality of parts (e.g., rubber sections) interconnected to one another in a closed configuration, the track 41 may have recesses or holes that interact with the drive wheel 42 in order to cause the track 41 to be driven (e.g., in which case the drive/guide lugs $48_1$-$48_N$ may be used only to guide the track 41 without being used to drive the track 41), and/or the ground-engaging outer side 47 of the track 41 may comprise various patterns of traction projections.

The drive wheel 42 is rotatable about an axis of rotation 49 for driving the track 41 around the track-engaging assembly 17. In this embodiment, the drive wheel 42 comprises a drive sprocket engaging the drive/guide lugs $48_1$-$48_N$ of the inner side 45 of the track 41 in order to drive the track 41. In this case, the drive sprocket 42 comprises a plurality of drive members $46_1$-$46_T$ (e.g., bars, teeth, etc.) distributed circumferentially of the drive sprocket 42 to define a plurality of lug-receiving spaces therebetween that receive the drive/guide lugs $48_1$-$48_N$ of the track 41.

In this embodiment, the drive wheel 42 is disposed between the leading idler wheels $50_1$, $50_2$ and the trailing idler wheels $50_3$, $50_4$ and such that the top run 65 of the track 41 projects upwardly above the drive wheel 42. More particularly, in this embodiment, the axis of rotation 49 of the drive wheel 42 is equidistant from axes of rotation of the leading idler wheels $50_1$, $50_2$ and axes of rotation of the trailing idler wheels $50_3$, $50_4$ and the drive wheel 42 is disposed to define an apex 64 of the top run 65 of the track 4 above the drive wheel 42.

The drive wheel 42 may be configured in various other ways in other embodiments. For example, in embodiments where the track 41 comprises recesses or holes, the drive wheel 42 may have teeth that enter these recesses or holes in order to drive the track 41. As yet another example, in some embodiments, the drive wheel 42 may frictionally engage the inner side 45 of the track 41 in order to frictionally drive the track 41.

The idler wheels $50_1$-$50_4$ are used to do at least one of supporting part of a weight of the track system $16_i$ on the ground via the track 41, guiding the track 41 as it is driven by the drive wheel 42, and tensioning the track 41. The idler wheels $50_1$-$50_4$ may be arranged in other configurations and/or the track system $16_i$ may comprise more or less idler wheels in other embodiments. For example, in other embodiments, the track-engaging assembly 17 may comprise roller wheels between the leading idler wheels $50_1$, $50_2$ and the trailing idler wheels $50_7$, $50_8$ to roll on the bottom run 66 of the track 41.

The sliding surface of the track-engaging assembly 17 is configured to slide against the bottom run 66 of the track 41. In this embodiment, the track-engaging assembly 17 comprises a slider that includes the sliding surface and is affixed to a bottom of the frame 44. In some examples, the slider may comprise a low-friction material which may reduce friction between its sliding surface and the inner side of the track 41. For instance, the slider may comprise a polymeric material having a low coefficient of friction with the rubber of the track 41, such as nylon, a Hifax® polypropylene, any other suitable material in other embodiments. In some embodiments, the sliding surface of the slider may comprise a coating (e.g., a polytetrafluoroethylene (PTFE) coating) that reduces friction between it and the inner side of the track 41, while a remainder of the slider may comprise any suitable material (e.g., a metallic material, another polymeric material, etc.). In other embodiments, the sliding surface may be an integral part of the frame 44 of the track-engaging assembly 17, i.e., not part of any slider separate from and affixed to the frame 44.

The frame 44 of the track system $16_i$ supports components of the track system $16_i$, including the idler wheels $50_1$-$50_4$. More particularly, in this embodiment, the leading idler wheels $50_1$, $50_2$ are mounted to the frame 44 in a front longitudinal end region of the frame 44 proximate the front longitudinal end 57 of the track system $16_i$, while the trailing idler wheels $50_3$, $50_4$ are mounted to the frame 44 in a rear longitudinal end region of the frame 44 proximate the rear longitudinal end 59 of the track system $16_i$.

The support 60 of the auxiliary track device 12 is configured to connect the auxiliary track device 12 to the vehicle 10 and support components of the auxiliary track device 12, including the track systems $16_1$, $16_2$. More particularly, in this embodiment, the support 60 comprises an attachment 61 to attach the auxiliary track device 12 to the vehicle 10 and a frame 71 supporting the track systems $16_1$, $16_2$.

In this embodiment, the auxiliary track device 12 is connectable to the vehicle 10 such that the track systems $16_1$, $16_2$ are located behind rear ones of the ground-engaging wheels $13_1$-$13_4$ of the vehicle 10. That is, at least part of each of the track systems $16_1$, $16_2$ is located behind the rear ones of the ground-engaging wheels $13_1$-$13_4$ when the auxiliary track device 12 is connected to the vehicle 10. More particularly, in this embodiment, at least a majority of each of the track systems $16_1$, $16_2$ is located behind the rear ones of the ground-engaging wheels $13_1$-$13_4$ when the auxiliary track device 12 is connected to the vehicle 10. In this case, an entirety of each of the track systems $16_1$, $16_2$ is located behind the rear ones of the ground-engaging wheels $13_1$-$13_4$ when the auxiliary track device 12 is connected to the vehicle 10.

In this example, the track systems $16_1$, $16_2$ overlap with respective ones of the rear ones of the ground-engaging wheels $13_1$-$13_4$ in the widthwise direction of the vehicle 10 when the auxiliary track device 12 is connected to the vehicle 10. That is, at least part of each of the track systems $16_1$, $16_2$ is aligned with at least part of a respective one of the rear ones of the ground-engaging wheels $13_1$-$13_4$ in the widthwise direction of the vehicle 10 when the auxiliary track device 12 is connected to the vehicle 10. The track systems $16_1$, $16_2$ may thus be in line with the ground-engaging wheels $13_1$-$13_4$ (e.g., at a same spacing from one another as the ground-engaging wheels $13_1$-$13_4$ in the widthwise direction of the vehicle 10).

Figure 9:
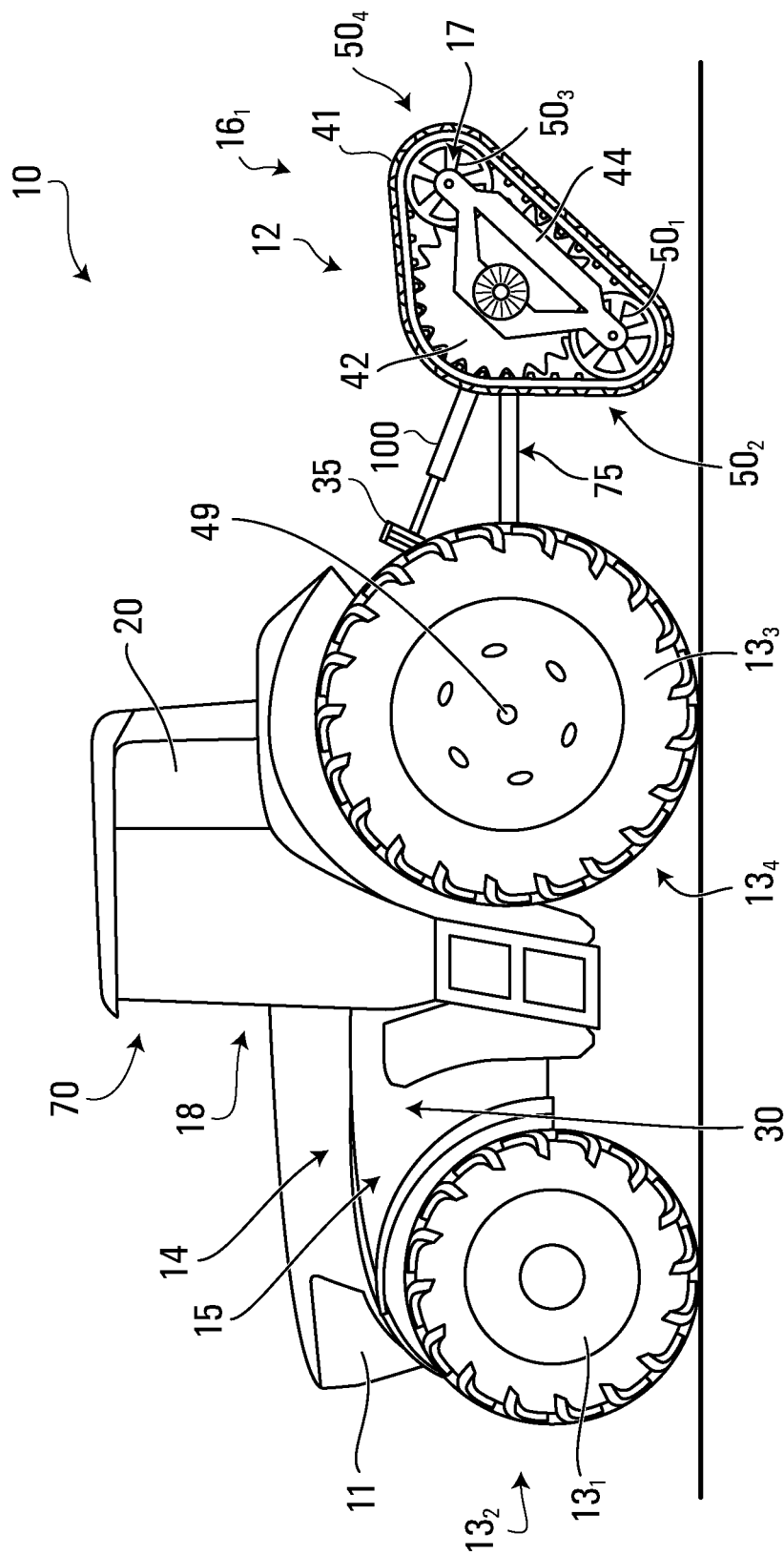
FIG. 9 shows the vehicle with the auxiliary track device retracted.

More particularly, in this embodiment, the auxiliary track device 12 is connectable to the three-point hitch 35 of the vehicle 10. The auxiliary track device 12 may thus be movable, including to be raised or lowered, relative to the frame 11 of the vehicle 10 by operation of the three-point hitch 35. For example, in some embodiments, with additional reference to FIGS. 1 and 9, the auxiliary track device 12 may be movable between a deployed position in which the track systems $16_1$,$16_2$ engage the ground, such as when additional traction and/or floatation is desirable, and a retracted position in which the track systems $16_1$,$16_2$ are off the ground, such as when additional traction and/or floatation may not be desired or needed.

Figure 12A:
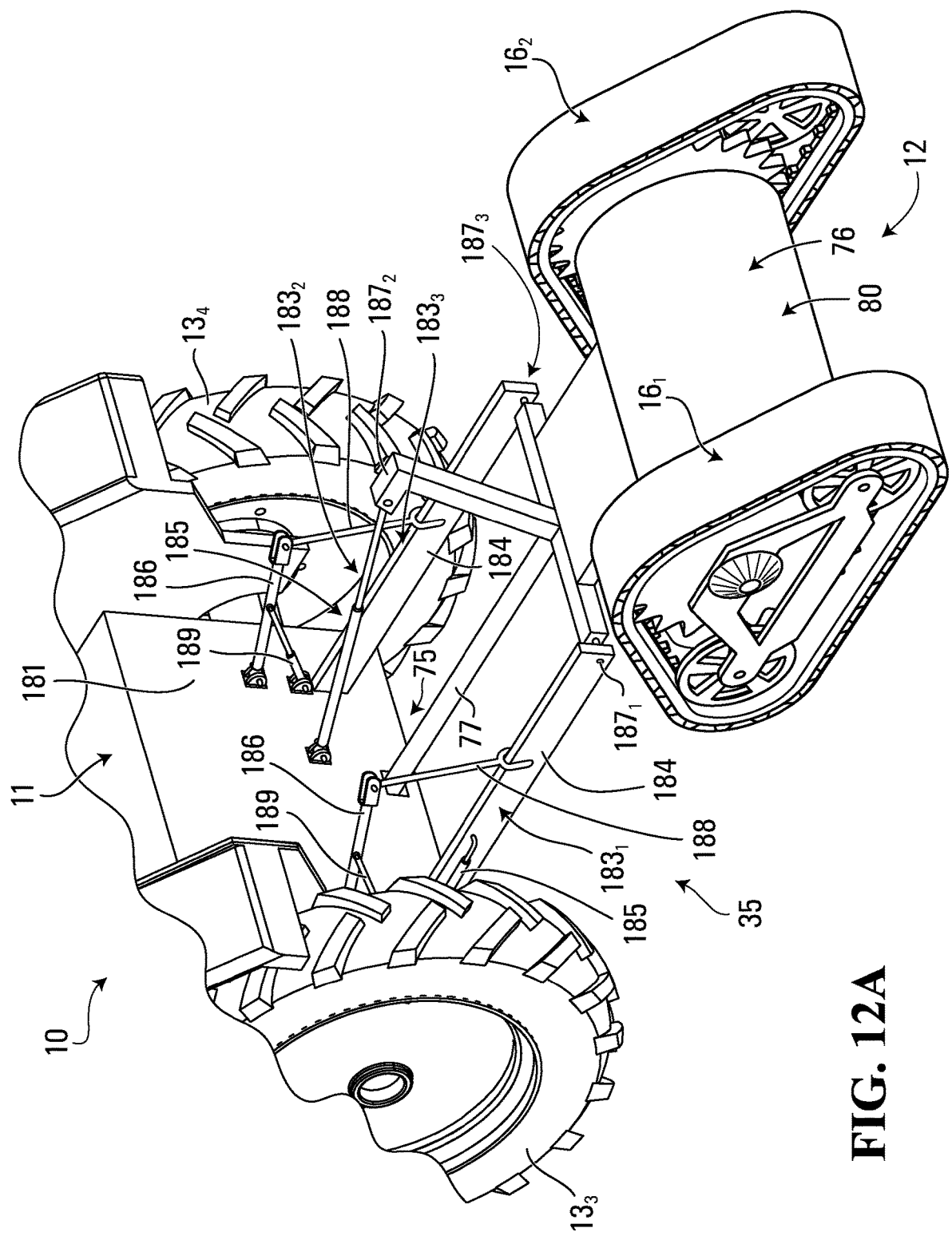
FIGS. 12A and 12B show an example of a three-point hitch.
Figure 12B:
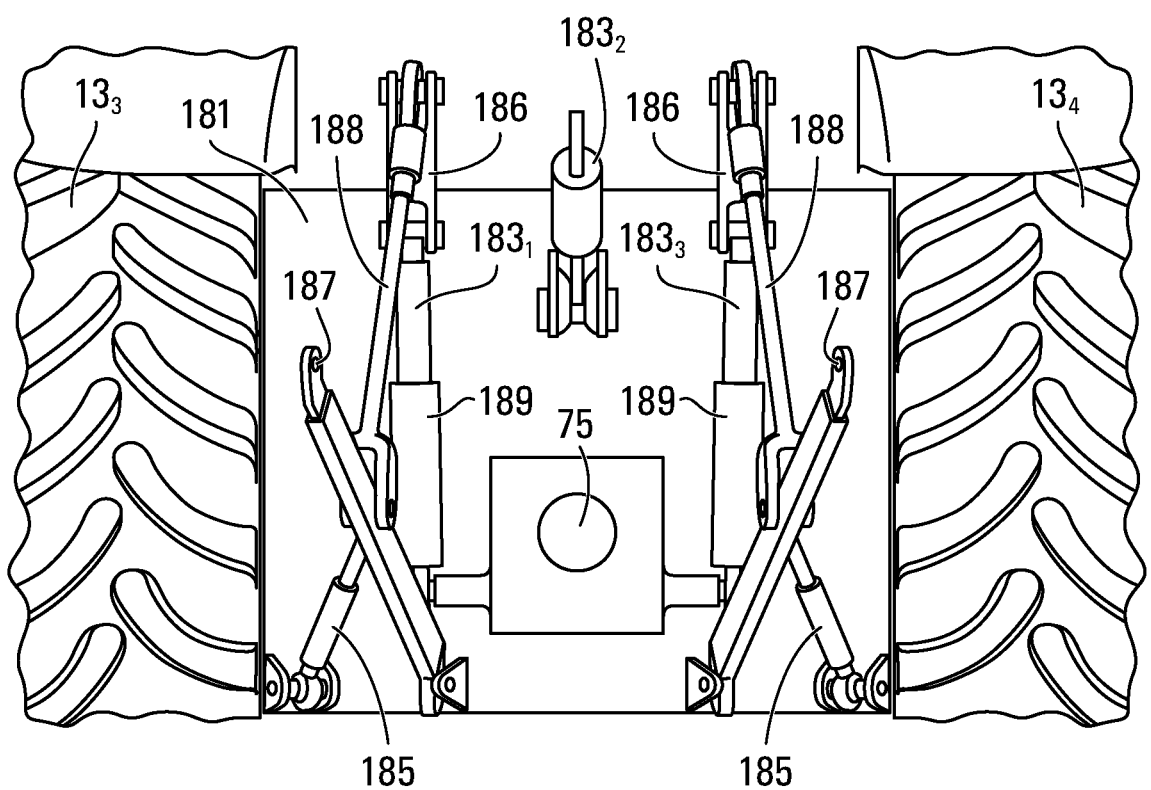

In this example, with additional reference to FIGS. 12A and 12B, the attachment 61 of the auxiliary track device 12 is configured to be attached to the three-point hitch 35 of the vehicle 10. More particularly, in this example, the attachment 61 comprises a plurality of attachment members $173_1$-$173_A$. In this case, the attachment members $173_1$-$173_A$ comprise a plurality of arms $175_1$-$175_2$ rigidly connected to each other. The arms $175_1$-$175_2$ may be of any suitable shape. In this example, the arm $175_1$ of the attachment 61 is generally horizontal relative to the ground and the arm $175_2$ is perpendicular to the arm $175_1$, such that a lower end of the arm $175_2$ is coincident with a center of the arm $175_1$. The attachment members $173_1$-$173_A$ also comprises attachment points $177_1$-$177_3$ that are configured to connect to the three-point hitch 35. Two lower ones of the attachment points $177_1$-$177_3$ are located at two ends of the arm $175_1$ and an upper one of the attachment points $177_1$-$177_3$ is located at an upper end of the arm $175_2$ of the attachment members $173_1$-$173_A$. Each of the attachment points $177_1$-$177_3$ may be of any suitable form. In this example, the two lower attachment points $177_1$ and $177_3$ are pins connected to each end of the arm $175_1$ of the attachment members $173_1$-$173_A$, while the upper attachment point $177_2$ is a pin connected to connected to an upper end of the arm $175_2$. In other cases, at least one of the attachment points $177_1$-$177_3$ may be a concave cover configured to house a spherical hitch. In other cases, at least one of the attachment points $177_1$-$177_3$ may be a hook. In other cases, the attachment points $177_1$-$177_3$ may be implemented in any other way. The attachment points $177_1$-$177_3$ of the attachment members $173_1$-$173_A$ are configured to be connected to links $187_1$-$187_3$ of the three-point hitch 35 of the vehicle 10.

The three-point hitch 35 comprises a frame 181 fixed to the frame 11 of the vehicle 10 and three connecting arms $183_1$-$183_3$. In this embodiment, the connecting arms $183_1$-$183_3$ are lower connecting arms and the connecting arm $183_2$ is an upper connecting arm. The upper connecting arm is generally in the middle of lower connecting arms $183_1$ and $183_3$ in the widthwise direction of the vehicle 10.

Each of the lower connection arms $183_1$ and $183_3$ comprises a draft link 184 that is pivotably attached to the frame 181 and pivotably attached to one of the attachment points $177_1$-$177_3$ at a link $187_N$. Each of the lower connection arms $183_1$ and $183_3$ further comprises a sway bar 185 that is pivotably attached to the frame 181 and pivotably attached to the draft link 184. The sway bar 185 stabilizes and controls the draft link in a lateral direction and may comprise an actuator (e.g., a piston-cylinder arrangement). Each of the lower connection arms $183_1$ and $183_3$ also comprises a lift arm 186, a lift link 188 and a hitch cylinder 189. The lift arm 186 is pivotably attached to the frame 181 and pivotably attached to the lift link 188, while the lift link 188 is otherwise pivotably attached to the draft link 184. The lift arm 186, the lift link 188 and the hitch cylinder 189 stabilize and control the draft link 184 in a heightwise direction and allow deploying and retracting the auxiliary track device 12. For this purpose, the hitch cylinder pivotably connects the frame 181 and the lift link 186 and comprises an actuator (e.g., a piston-cylinder arrangement).

The upper connection arm $183_2$ comprises an actuator (e.g., a piston-cylinder arrangement) that is pivotably attached to the frame 181 and pivotably attached to one of the attachment points $177_1$-$177_3$ at a link $187_N$.

Figure 12C:
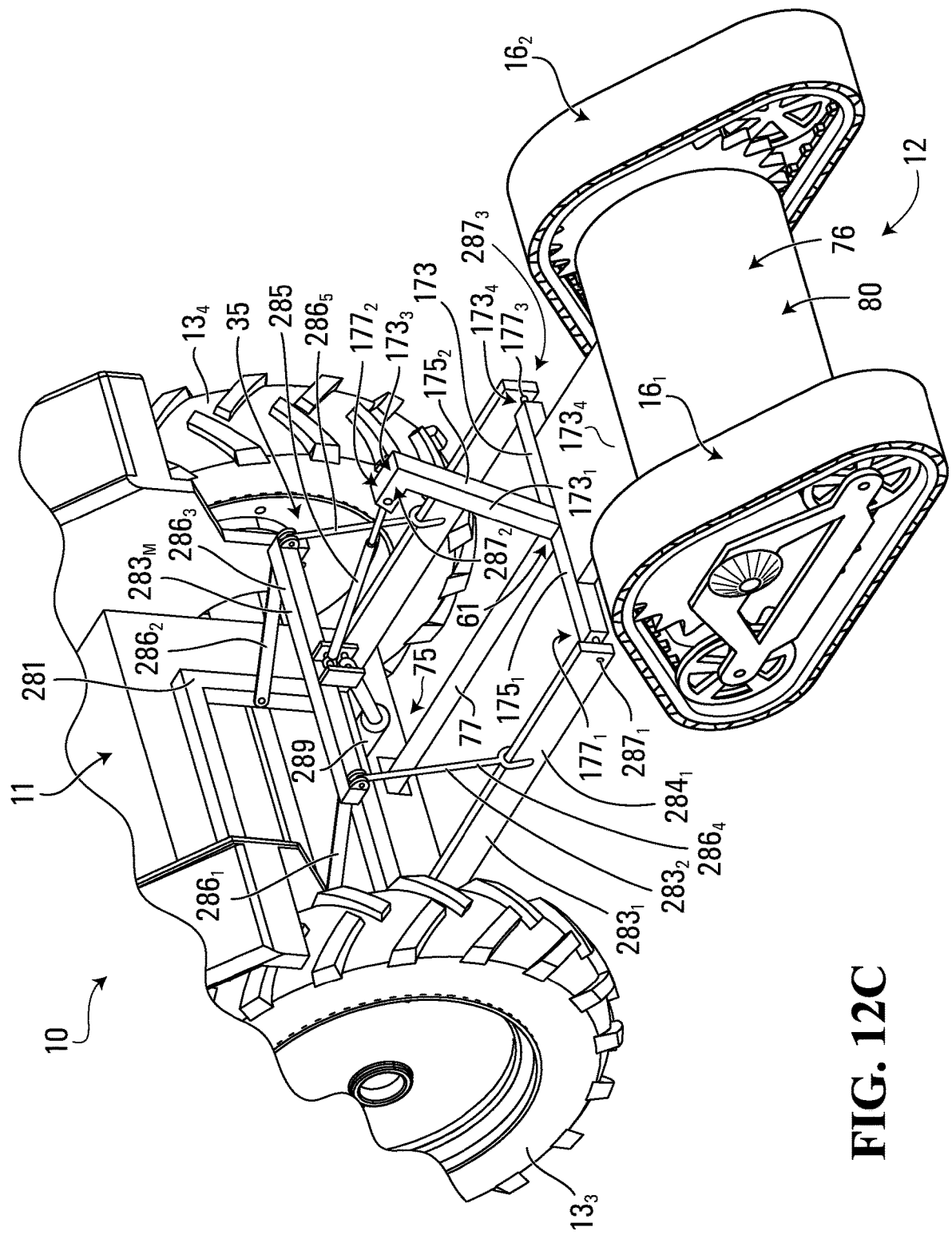
FIG. 12C shows another example of a three-point hitch.

In another example, with additional reference to FIG. 12C, the three-point hitch 35 may comprise a frame 281 fixed to the frame 11 of the vehicle 10 and a plurality of members $283_1$-$283_M$ that are directly or indirectly connected to the frame 281 of the three-point hitch 35. In this example, the members $283_1$-$283_M$ comprise lower connecting arms $284_1$-$284_2$, an upper connecting arm 285, and structural arms $286_1$-$286_5$. The lower connecting arms $284_1$-$284_2$ are connected to the frame 281 of the three-point hitch 35, are pivotable relative to the frame 281 and are generally parallel one to another. The structural arms $286_1$-$286_2$ are also connected to the frame 281 of the three-point hitch 35, are pivotable relative to the frame 281 and are generally parallel one to another. The structural arms $286_1$-$286_2$ are generally higher relative to the ground than the lower connecting arms $284_1$-$284_2$. The structural arm $286_3$ connects to an end of each of the structural arms $286_1$-$286_2$, is pivotable relative to each of the structural arms $286_1$-$286_2$ and is generally parallel to the ground. Each of the structural arms $286_4$-$286_5$ connects the structural arm $286_3$ and a given one of the lower connecting arms $284_1$-$284_2$, and is pivotable relative to the structural arm $286_3$ and the given one of the lower connecting arms $284_1$-$284_2$. The upper connecting arm 285 is connected to the structural arm $286_3$ and is pivotable relative to the structural arm $286_3$. The links $287_1$-$287_3$ of the three-point hitch 35 are located at a rear end of the lower connecting arms $284_1$-$284_2$ and the upper connecting arm 285 of the three-point hitch 35. In this example, the members $283_1$-$283_M$ further comprise a hydraulic actuator 289 (e.g., a piston-cylinder arrangement) powered by the vehicle 10, connected to the frame 281 of the three-point hitch 35 and to the structural arm $286_3$ of the three-point hitch 35, pivotable relative to the frame 281 of the three-point hitch 35 and pivotable relative to the structural arm $286_3$ of the three-point hitch 35. The hydraulic actuator 289 of the three-point hitch allows the vehicle 10 to rotate the three-point hitch 35 relative to the vehicle 10.

The links $187_1$-$187_3$ may be of any suitable form. In this example, each of the lower links $187_1$ and $187_3$ comprises a hole configured to house a given one of the lower attachment points $177_1$ and $177_3$ of the attachment members $173_1$-$173_A$ of the attachment 61 of the auxiliary track device 12. The lower links $187_1$ and $187_3$ are connected to the lower attachment points $177_1$ and $177_3$ of the attachment members $173_1$-$173_A$. The lower attachment points $177_1$ and $177_3$, being housed in the lower links $187_1$ and $187_3$, may be secured by any suitable device, such as a smaller pin or a retaining ring. The upper link $187_2$ comprises a hole configured to house the upper attachment point $177_2$ of the attachment members $173_1$-$173_A$. In this example, the upper link $187_2$ may be at a distance relative to the frame 181 of the three-point hitch 35 that is different than the distance between each of the lower links $187_1$ and $187_3$, and the frame 181 of the three-point hitch 35, depending on the hydraulic actuator 189 of the three-point hitch 35. In other examples, the links $187_1$-$187_3$ may have any other suitable configuration and/or suitable shape, such as a spherical shape configured to be housed within each of the attachment points of the attachment members $173_1$-$173_4$. In other examples, the links $187_1$-$187_3$ may have any other suitable configuration and/or suitable shape, such as the shape of a hook configured to connect to each of the attachment points of the attachment members $173_1$-$173_4$.

The three-point hitch 35 may comprise other parts, such as structural arms, hydraulic stabilizing arms, a drawbar, or any other suitable part, and/or may be implemented in any other suitable way in other embodiments.

Figure 10A:
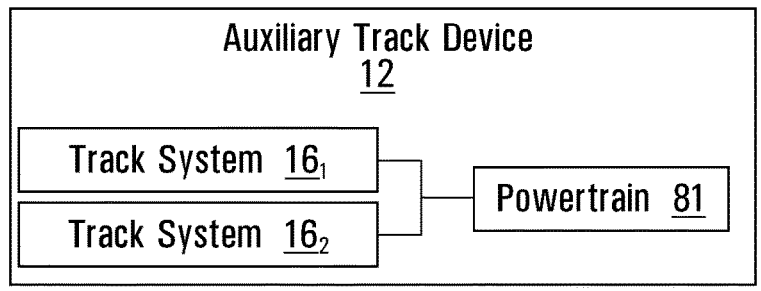
FIG. 10A shows the auxiliary track device comprising a powertrain.

In this embodiment, the auxiliary track device 12 is powered to further enhance traction of the vehicle 10. That is, as shown in FIG. 10A, the auxiliary track device 12 comprises a powertrain 81 to provide power to the drive wheel 42 of each of the track systems $16_1$,$16_2$ to rotate the drive wheel 42 of that track system in order to move the track 41 of that track system.

Figure 10B:
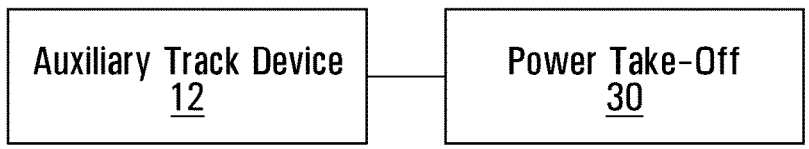
FIGS. 10B and 10C show the auxiliary track device connected to a power take-off of the vehicle.

Power may be provided to the auxiliary track device 12 in any suitable way. In this embodiment, with additional reference to FIG. 10B, the auxiliary track device 12 is connectable to the power take-off 30 of the vehicle such that power for the auxiliary track device 12 is derived from the power source 14 of the vehicle 10. The attachment 61 of the auxiliary track device 12 comprises a power take-off link 75 connectable to the power take-off 30 to receive power from the power take-off 30, while the powertrain 81 comprises a transmission 76 to transmit power to the drive wheel 42 of each of the track systems $16_1$,$16_2$.

Figure 10C:
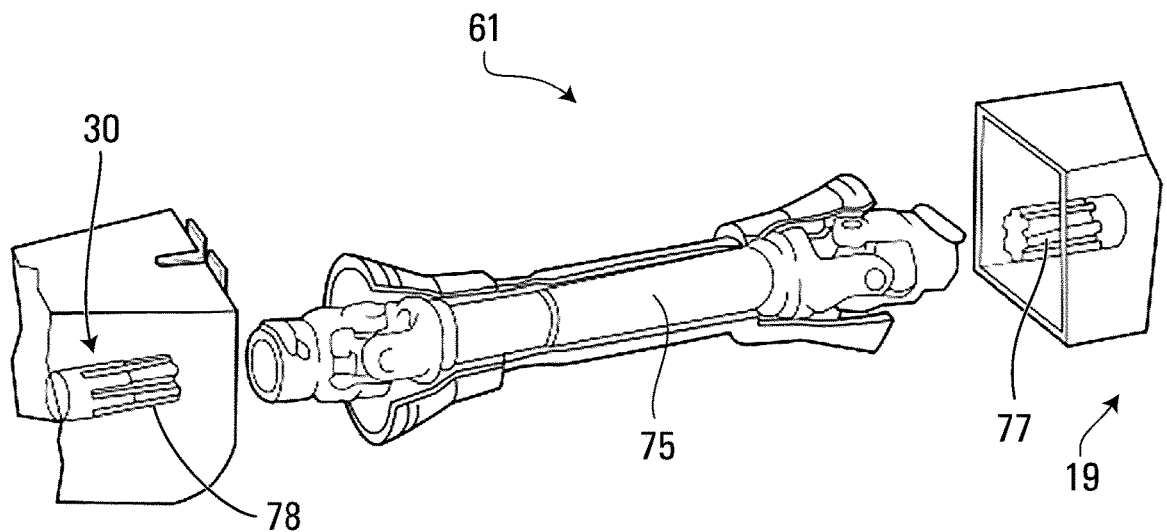

In this example, with additional reference to FIG. 10C, the power take-off link 75 links an input shaft 77 to an output shaft 78 of the power take-off 30. The power take-off link 75 comprises two universal joints. The transmission 76 comprises gearing 80 to transmit power at the input shaft 77 to the drive wheel 42 of each of the track systems $16_1$,$16_2$. The gearing 80 comprises an input connected to the input shaft 77 and an output connected to the drive wheel 42 of each of the track systems $16_1$,$16_2$ such that rotation of the input shaft 77 causes rotation of the drive wheel 42 of each of the track systems $16_1$,$16_2$.

Figure 11A:
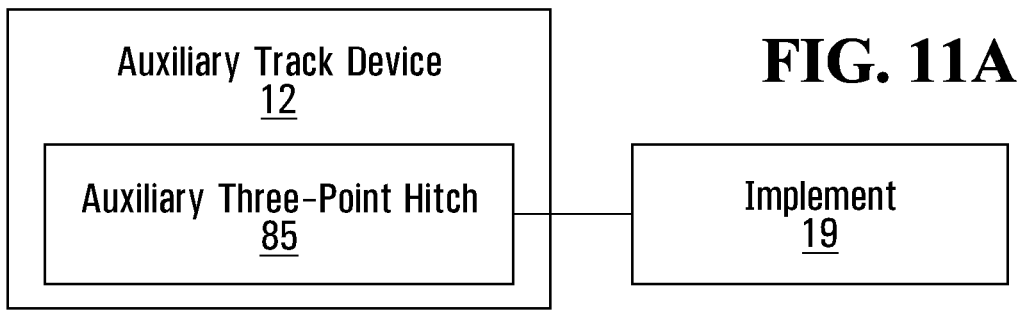
FIGS. 11A and 11B show an example of an embodiment in which the auxiliary track device comprises an auxiliary three-point hitch connected to an implement for performing work.
Figure 11B:
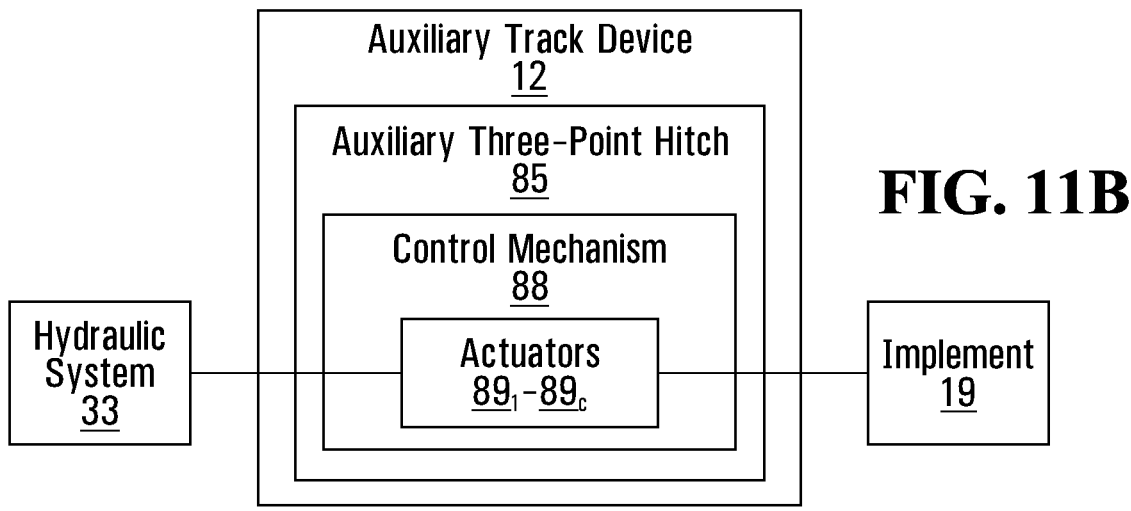

In some embodiments, such as where the auxiliary track device 12 is connected to the three-point hitch 35 of the vehicle 10, as shown in FIGS. 11A and 11B, the auxiliary track device 12 may comprise an auxiliary three-point hitch 85 allowing the implement 19 to be connected even if the three-point hitch 35 of the vehicle 10 is taken to connect the auxiliary track device 12.

The auxiliary three-point hitch 85 of the auxiliary track device 12 may emulate the three-point hitch 35 of the vehicle 10 so that the implement 19 may be mounted and used as if it were mounted to the three-point hitch 35 of the vehicle 10. In this embodiment, the auxiliary three-point hitch 85 of the auxiliary track device 12 comprises a plurality of arms $87_1$-$87_T$ connectable to the implement 19 and a control mechanism 88 configured to control the implement 19 when connected to the arms $87_1$-$87_T$. For example, the control mechanism 88 may comprise a plurality of actuators $89_1$-$89_C$ to move the implement 19, including to raise or lower the implement 19, relative to the frame 11 of the vehicle 10 by operation of the three-point hitch 85 of the auxiliary track device 12. For instance, the actuators $89_1$-$89_C$ may be hydraulic actuators (i.e., piston-cylinder arrangements) connected to the hydraulic system 33 of the vehicle 10 (e.g., via hydraulic lines) and acting on respective ones of the arms $87_1$-$87_T$ to move the implement 19.

Figure 13:
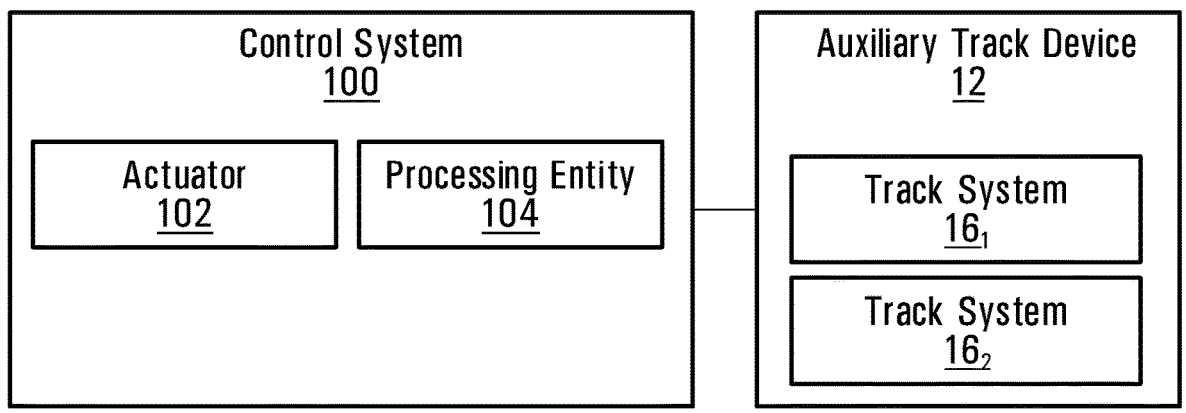
FIG. 13 shows an example of an embodiment of a control system to control the auxiliary track device.

With additional reference to FIG. 13, in this embodiment, the vehicle 10 comprises a control system 100 configured to control the auxiliary track device 12, such as to selectively deploy and retract the auxiliary track device 12 onto and from the ground and/or to apply power to the track systems $16_1$,$16_2$ (e.g., to the drive wheel 42 of each of the track systems $16_1$,$16_2$) and/or other components of the auxiliary track device 12.

In this embodiment, the control system 100 comprises a processing entity 104 configured to control the three-point hitch 35 and the power take-off 30 of the vehicle 10 in order to control the auxiliary track device 12. More particularly, in this embodiment, the control system 100 is configured to control the auxiliary track device 12 in response to one or more commands. As further discussed below, in various embodiments, these commands, which may be referred to as "auxiliary-track-device-control (ATDC) commands", may be generated automatically by the processing entity 104 and/or may be provided to the processing entity 104 by an individual such as the user of the vehicle 10. Based on the ATDC commands, the processing entity 104 is configured to issue signals to control the three-point hitch 35 and/or the power take-off 30 of the vehicle 10 in order to control the auxiliary track device 12.

Figure 14:
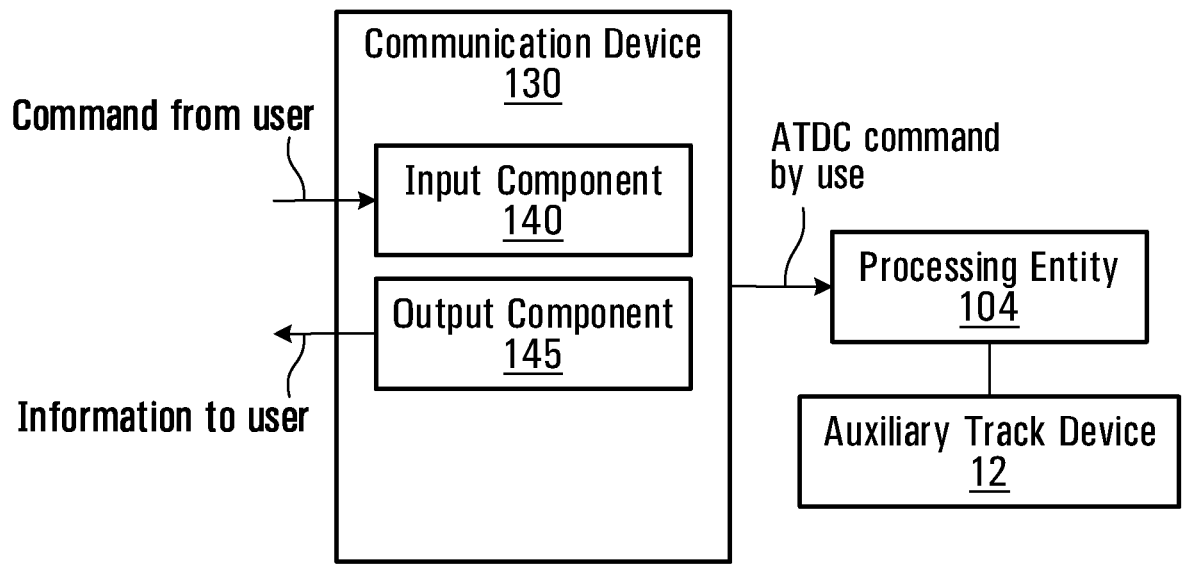
FIG. 14 shows an example of an embodiment of the control system that allows on-demand control of the auxiliary track device by a user of a communication device.

For example, with additional reference to FIG. 14, in some embodiments, the control system 100 may be configured to allow an individual such as the user of the vehicle 10 to control the auxiliary track device 12. The ATDC commands may thus be provided to the processing entity 104 by the user to control the auxiliary track device 12 "on-demand".

A communication device 130 can be used by the user to communicate with the processing entity 104. The communication device 130 comprises an input component 140 that the user can act upon to input the ATDC commands in order to control the auxiliary track device 12. For example, in some embodiments, the input component 140 may comprise a mechanical input element, such as a button, a switch, a lever, a dial, a knob, or any other physical element, and/or a virtual input element, such as a virtual button or other virtual control of a graphical user interface (GUI) displayed on a screen that the user can act upon to control the auxiliary track device 12.

The communication device 130 may also comprise an output component 145 that can convey information about the auxiliary track device 12 (e.g., a state of the auxiliary track device 12, including whether the auxiliary track device 12 is in the deployed position or the retracted position, a rotational speed of the drive wheel 42 of each of the track systems $16_1$,$16_2$, etc.) to the user in order to facilitate its control. In some embodiments, the output component 145 may comprise a display for displaying information to the user or a speaker for emitting sound (e.g., an alarm, an utterance, etc.). For example, in some embodiments, the output component 145 may indicate whether the auxiliary track device 12 is in the deployed position or the retracted position and a suggested change in that position depending on whether more or less traction and/or floatation may be desirable in a current environment of the vehicle 10.

Figure 15:
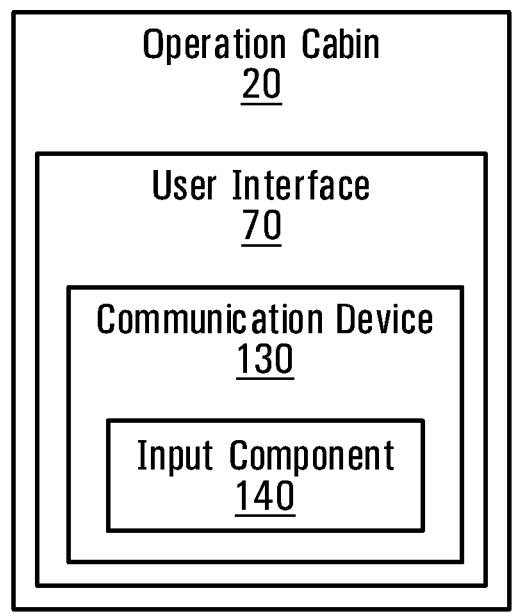
FIG. 15 shows an example of an embodiment of the communication device as part of a user interface of an operator cabin of the vehicle.

For example, in some embodiments, with additional reference to FIG. 15, the communication device 130 may be part of the user interface 70 of the operator cabin 20 of the vehicle 10 (e.g., the input component 140 of the communication device 130 may be part of the instrument panel of the vehicle 10).

Figure 16:
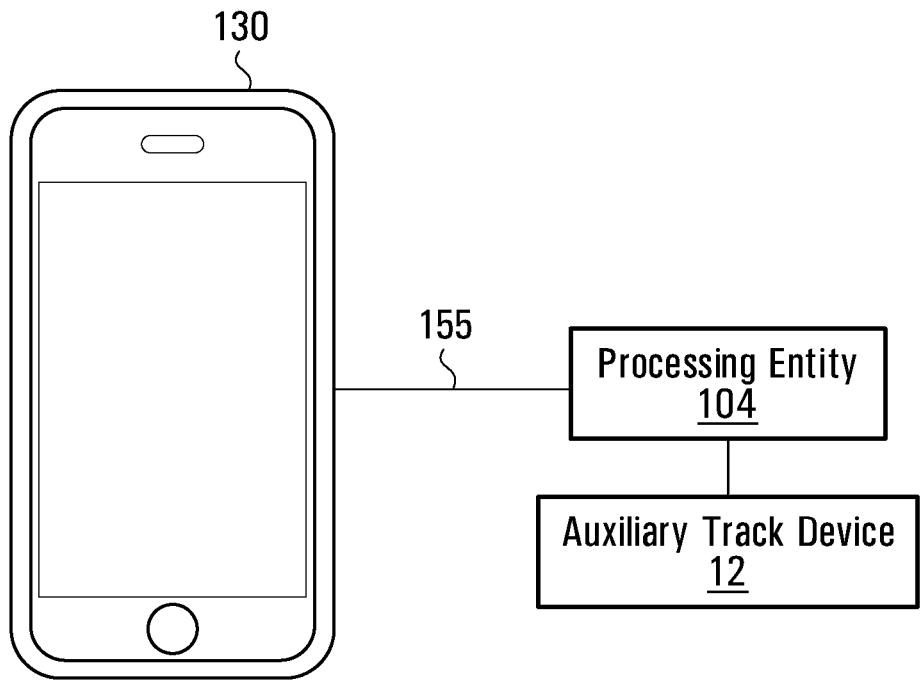
FIG. 16 shows an example of an embodiment in which the communication device is a personal communication device.

As another example, in some embodiments, with additional reference to FIG. 16, the communication device 130 may be a personal communication device (e.g., a smartphone, a computer, etc.) or other device that is usable by the user and distinct from and not built into the user interface 70 of the operator cabin 20 of the vehicle 10. This may be useful, for instance, in situations where the vehicle 10 was not originally manufactured with the auxiliary track device 12 and/or is not readily modifiable to allow interaction between the control system 100 and the user interface 70 and/or other original components of the vehicle 10.

The communication device 130 may interact with the processing entity 104 of the control system 100 over a communication link 155, which may be wireless and/or wired (e.g., Bluetooth or other short-range or near-field wireless connection, WiFi or other wireless LAN, WiMAX or other wireless WAN, cellular, Universal Serial Bus (USB), etc.). For example, in some embodiments, the communication device 130 may be:
- a smartphone or other wireless phone; a tablet computer; a head-mounted display, smartwatch or other wearable device; or any other communication device carried, worn or otherwise associated with the user;
- a server or other computing entity (e.g., implementing a website) associated with: the user; an organization associated with the user; a manufacturer of the auxiliary track device 12 and/or of the vehicle 10; a retailer, distributor, or other vendor of the auxiliary track device 12 and/or the vehicle 10; or any other party who may have an interest in the auxiliary track device 12 and/or the vehicle 10;
- etc.

In some cases, such as where the communication device 130 is a smartphone, tablet, head-mounted display, smartwatch, or other communication device carried or worn by the user, communication between the communication device 130 and the processing entity 104 of the control system 100 may be direct, i.e., without any intermediate device. For instance, in some embodiments, this can be achieved by pairing (e.g., Bluetooth pairing) the communication device 130 and the processing entity 104 of the control system 100. In other cases, such as where the communication device 130 is remote from the processing entity 104 of the control system 100, communication between the communication device 130 and the processing entity 104 of the control system 100 may be indirect, e.g., through one or more networks and/or one or more additional communication devices. For example, in some embodiments, the processing entity 104 of the control system 100 may communicate (e.g., via the transmitter 164 and/or the receiver 162 of the processing entity 104) with a WiFi hotspot or cellular base station, which may provide access to a service provider and ultimately the Internet or another network, thereby allowing the processing entity 104 of the control system 100 and the communication device 130 to communicate.

For example, in some embodiments, the communication device 130 may be a smartphone or other mobile phone, a tablet, a smart watch, head-mounted display or other wearable device, or any other communication device that may be carried by the user, and the communication link 155 may be a short-range wireless link (e.g., Bluetooth) or a wired link (e.g., USB); in other embodiments, the communication device 130 may be a server or other computing entity or a smartphone or other mobile phone, a tablet, a smart watch, head-mounted display or other wearable device, or any other communication device that may be carried by the user and the communication link 155 may be implemented by a data network such as the Internet over a wired connection and/or a wireless connection (e.g., WiFi, WiMAX, cellular, etc.); and, in other embodiments, the communication device 130 may be a server or other computing entity and the communication link 155 may be implemented over a wireless connection using, for instance, dedicated short-range communication (DSRC), IEEE 802.11, Bluetooth and CALM (Communications Access for Land Mobiles), RFID, etc.

In some embodiments, an application ("app", i.e., software) may be installed on the communication device 130 to interact with the processing entity 104 of the control system 100 of the vehicle 10. For example, in some embodiments, such as where the communication device 130 is a smartphone, a tablet, a computer, etc., the user may download the app from a repository (e.g., Apple's App Store, iTunes, Google Play, Android Market, etc.) or any other website onto the communication device 130. Upon activation of the app on the communication device 130, the user may access certain features relating to the control system 100 of the vehicle 10 locally on the communication device 130. In addition, a data connection can be established over the Internet with a server of which executes a complementary server-side application interacting with the app on the communication device 130.

For example, in some embodiments, the communication device 130 may be a smartphone of the user of the vehicle 10, onto which an app to interact with the control system 100 of the vehicle 10 has been installed (e.g., downloaded).

Figure 17:
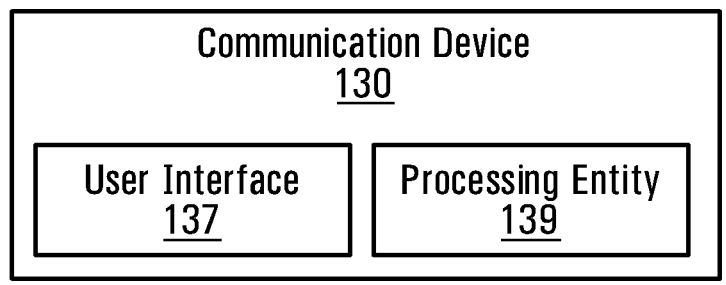
FIGS. 17 and 18 show an example of an embodiment of the communication device.
Figure 18:
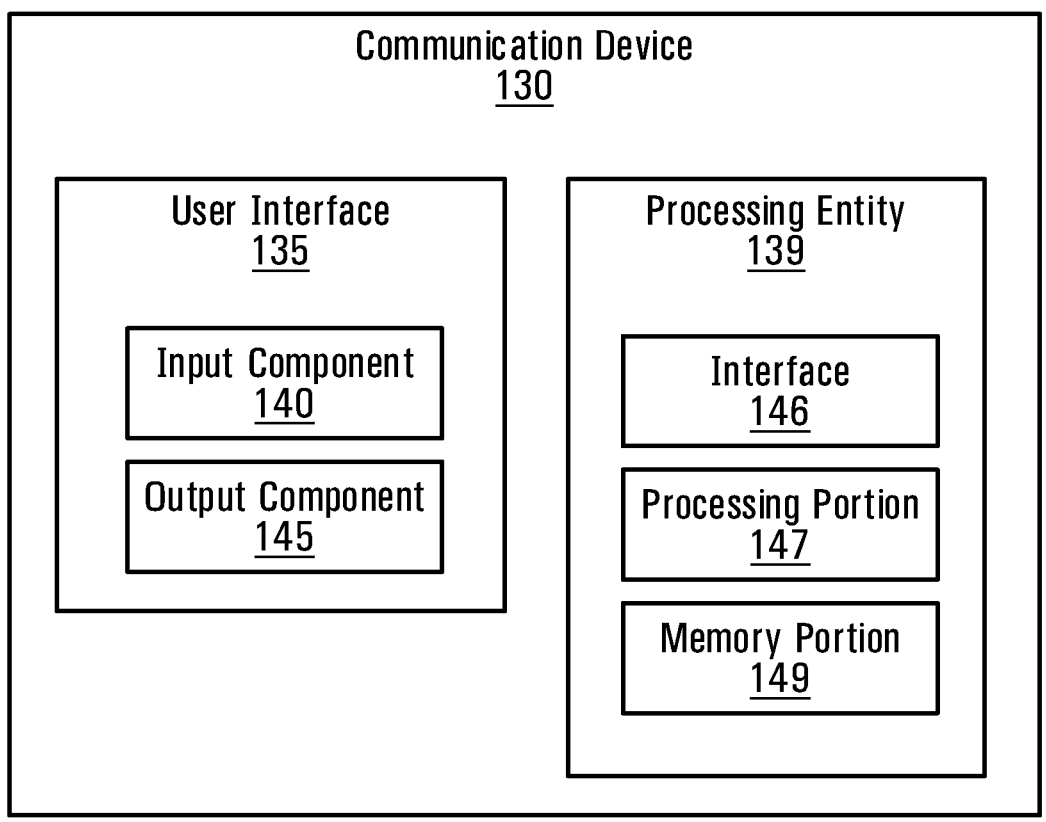

In various embodiments, as shown in FIGS. 17 and 18, the communication device 130 (e.g., whether part of the user interface 70 of the operator cabin 20, or a personal communication device such as a smartphone, tablet, computer, etc.) may comprise a user interface 137 and a processing entity 139. The user interface 137 comprises the input component 140 and, if applicable, the output component 145 (e.g., buttons, knobs, etc., a display, a speaker, etc., of the operator cabin 20, of a smartphone, etc.). The processing entity 139 comprises an interface 146, a processing portion 147, and a memory portion 149, which are implemented by suitable hardware and software.

The interface 146 comprises one or more inputs and outputs allowing the processing entity 139 to receive input signals from and send output signals to other components to which the processing entity 139 is connected (i.e., directly or indirectly connected). For example, in this embodiment, an output of the interface 146 is implemented by a transmitter (e.g., a wireless transmitter) to transmit a signal to the processing entity 104 of the control system 100 or the user interface 137. An input of the interface 146 is implemented by a receiver to receive a signal from the user interface 137 or the processing entity 104 of the control system 100.

The processing portion 147 comprises one or more processors for performing processing operations that implement functionality of the processing entity 139. A processor of the processing portion 147 may be a general-purpose processor executing program code stored in the memory portion 149. Alternatively, a processor of the processing portion 147 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory portion 149 comprises one or more memories for storing program code executed by the processing portion 147 and/or data used during operation of the processing portion 147. A memory of the memory portion 149 may be a semiconductor medium (including, e.g., a solid-state memory), a magnetic storage medium, an optical storage medium, and/or any other suitable type of memory.

A memory of the memory portion 149 may be read-only memory (ROM) and/or random-access memory (RAM), for example.

In some embodiments, two or more elements of the processing entity 139 may be implemented by devices that are physically distinct from one another and may be connected to one another via a bus (e.g., one or more electrical conductors or any other suitable bus) or via a communication link which may be wired. In other embodiments, two or more elements of the processing entity 139 may be implemented by a single integrated device.

Figure 19:
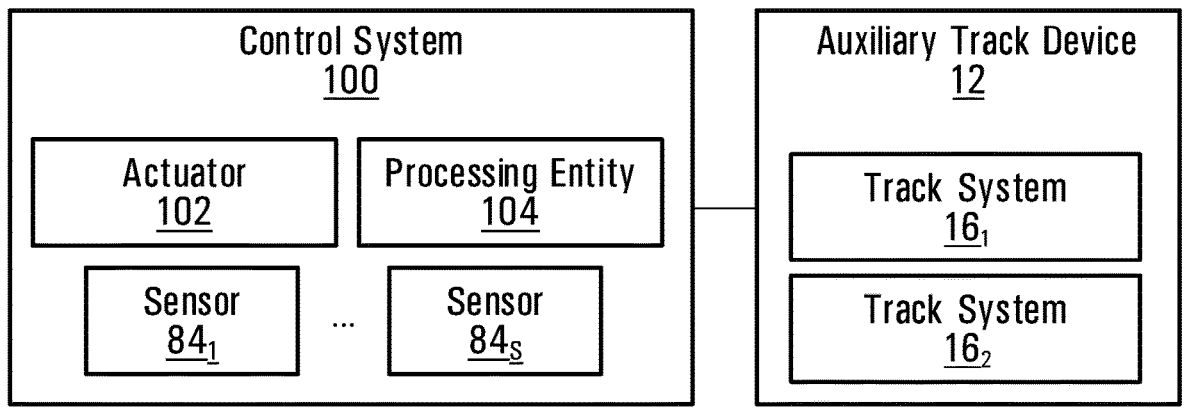
FIG. 19 shows an example of an embodiment of the control system to automatically control the auxiliary track device.

With additional reference to FIG. 19, in some embodiments, the control system 100 may automatically control (i.e., without user input) the auxiliary track device 12. The ATDC commands may thus be automatically generated by the processing entity 104 to control the auxiliary track device 12.

Automatic control of the auxiliary track device 12 by the control system 100 may be effected based on various information. For example, in some embodiments, this information may include:
- information regarding the state of the vehicle 10, such as, for example, the speed of the vehicle 10; the direction of motion of the vehicle 10; a parameter of the powertrain 15 of the vehicle 10 (e.g., a speed of a motor of the power source 14, a ratio of a transmission, etc.), loading on the vehicle 10, and/or any other parameter that pertains to the state of the vehicle 10;
- information regarding the environment of the vehicle 10, such as, for example, the compliance, such as the softness or hardness, the slipperiness, the soil compatibility, and/or the profile of the ground, and/or any other parameter that pertains to the environment of the vehicle 10;
- information regarding the state of the auxiliary track device 12, such as, for example: a speed and/or a direction of motion of the track 41 around the track-engaging assembly 17 of each of the track systems 16$_1$,16$_2$. a tension of the track 41 of each of the track systems 16$_1$,16$_2$, and/or any other parameter that pertains to the state of the auxiliary track device 12; and/or
- any other information that may be relevant to controlling the auxiliary track device 12.

In this embodiment, the control system 100 comprises a plurality of sensors 84$_1$-84$_s$ for sensing parameters of the vehicle 10 to provide parts of the information used to control the auxiliary track device 12 to the processing entity 104. For example, in some embodiments, the parameters of the vehicle 10 that can be sensed by the sensors 84$_1$-84$_s$ may include:
- the speed of the vehicle 10;
- the direction of motion of the vehicle 10;
- the speed of a motor of the power source 14;
- the loading on the vehicle 10;
- the compliance, such as the softness or hardness, the slipperiness, the soil compatibility, and/or the profile of the ground;
- the speed and/or the direction of motion of the track 41 around the track-engaging assembly 17 of each of the track systems 16$_1$,16$_2$;
- a physical characteristic (e.g., a temperature, etc.) of the track 41 of each of the track systems 16$_1$,16$_2$;
- the tension of the track 41 of each of the track systems 16$_1$,16$_2$;
- etc.

Figure 20:
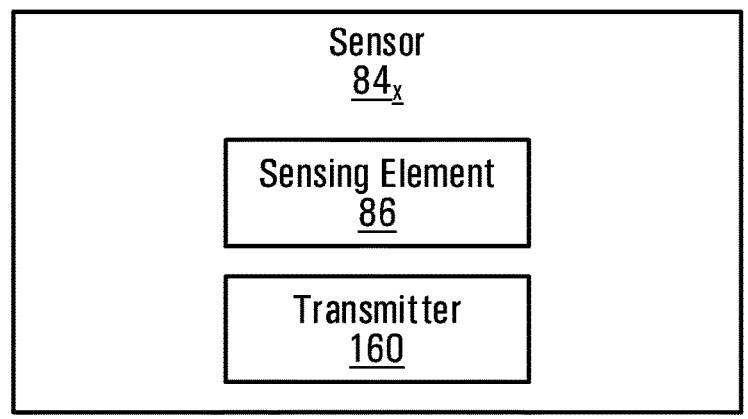
FIG. 20 shows an example of an embodiment of a sensor of the control system.

Each sensor 84$_x$ is configured to sense a parameter of the vehicle 10 and issue a signal indicative of that parameter. To that end, with additional reference to FIG. 20, the sensor 84$_x$ comprises a sensing element 86 configured to sense the parameter of the vehicle 10 to be sensed. For example, in some embodiments, to sense:
- the speed of the vehicle 10, the sensing element 86 may comprise a speedometer of the vehicle 10;
- the direction of motion of the vehicle 10, the sensing element 86 may comprise a gyroscope;
- the speed of a motor of the power source 14, the sensing element 86 may comprise part of a motor speed sensor (e.g., engine speed sensor);
- the profile (e.g., a slope or steepness or the levelness) of the ground, the sensing element 86 may comprise a gyroscope;
- the compliance (e.g., softness or hardness) of the ground, the sensing element 86 may comprise part of a laser sensor or an ultrasound sensor;
- the speed of motion of the track 41 around the track-engaging assembly 17 of each of the track systems 16$_1$,16$_2$, the sensing element 86 may comprise a tachometer (e.g., a wheel speed sensor) configured to sense a rotational speed of the drive wheel 42 of that track system;
- the temperature or another physical characteristic of the track 41 of each of the track systems 16$_1$,16$_2$, the sensing element 86 may comprise a temperature sensor or another sensor for sensing that physical characteristic;
- etc.

Figure 21:
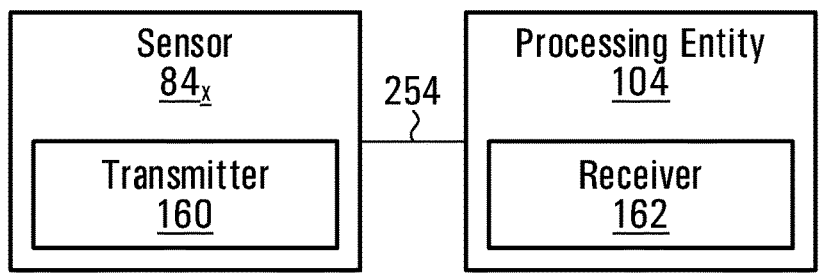
FIGS. 21 and 22 show examples of the sensor communicating with a processing entity of the control system via a communication link.

The sensor 84$_x$ is configured to communicate the signal indicative of the parameter it senses to the processing entity 104 via a communication link 254, as shown in FIG. 21. To that end, the sensor 84$_x$ comprises a transmitter 160 for transmitting the signal indicative of the parameter it senses to the processing entity 104, which comprises a receiver 162 to receive the signal from the sensor 84$_x$.

The transmitter 160 of the sensor 84$_x$ and the receiver 162 of the processing entity 104 may establish the link 254 between one another in any suitable way. In some embodiments, the link 254 may be a wireless link such that the sensor 84$_x$ and the processing entity 104 are connected wirelessly. Thus, in such embodiments, the transmitter 160 of the sensor 84$_x$ is a wireless transmitter that can wirelessly transmit the signal from the sensor 84$_x$ and the receiver 162 of the processing entity 104 is a wireless receiver that can wirelessly receive the signal. For example, the transmitter 160 and the receiver 162 may implement radio-frequency identification (RFID) technology. In such an example, the transmitter 160 may be an RFID tag while the receiver 162 may be an RFID reader (e.g., active, passive or battery-assisted passive (BAP) RFID technology). Any other wireless communication technology may be used in other examples (e.g., WiFi, dedicated short-range communication (DSRC), etc.). In other embodiments, the link 254 may be a wired link such that the sensor 84$_x$ and the processing entity 104 are connected by a wire.

Figure 22:
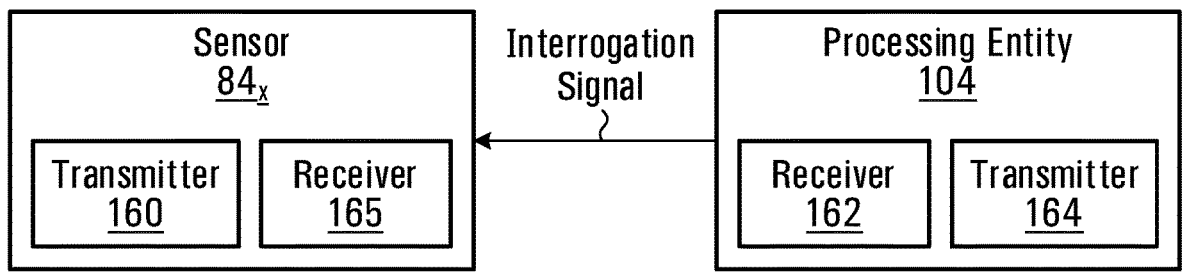

The signal indicative of the parameter of the vehicle 10 sensed by the sensor 84$_x$ may be issued by the sensor 84$_x$ in any suitable manner. In some embodiments, the sensor 84$_x$ is configured to issue the signal autonomously. For instance, the transmitter 160 of the sensor 84$_x$ may issue the signal repeatedly (e.g., periodically or at some other predetermined instants). In other embodiments, the processing entity 104 may be configured to issue an interrogation signal directed to the sensor 84$_x$, which is configured to issue the signal indicative of the parameter of the vehicle 10 that it senses to the processing entity 104 in response to the interrogation signal. In such embodiments, as shown in FIG. 22, the processing entity 104 may comprise a transmitter 164 to transmit the interrogation signal to the sensor $84_x$, which comprises a receiver 165 to receive the interrogation signal.

The sensors $84_1$-$84_s$ may be located at various locations on the vehicle 10 in various embodiments.

In some embodiments, one or more of the sensors $84_1$-$84_s$ may be part of the auxiliary track device 12. For example, in some embodiments, one or more of the sensors $84_1$-$84_s$ may be part of the track 41 of each of the track systems $16_1$,$16_2$. For instance, in some embodiments, one or more of the sensors $84_1$-$84_s$ may be embedded in the elastomeric material of the track 41 of each of the track systems $16_1$,$16_2$. As an example, in some embodiments, one or more of the sensors $84_1$-$84_s$ may be arranged as discussed in International Application Publication WO/2017/000068, which is hereby incorporated by reference herein.

The processing entity 104 is configured to issue the ATDC commands to control the auxiliary track device 12 based on information derived from the sensors $84_1$-$84_s$ and possibly other information. More specifically, in this embodiment, the processing entity 104 issues the ATDC commands as signals directed to the three-point hitch 35 and the power take-off 30 of the vehicle 10 in order to control the auxiliary track device 12.

Figure 23:
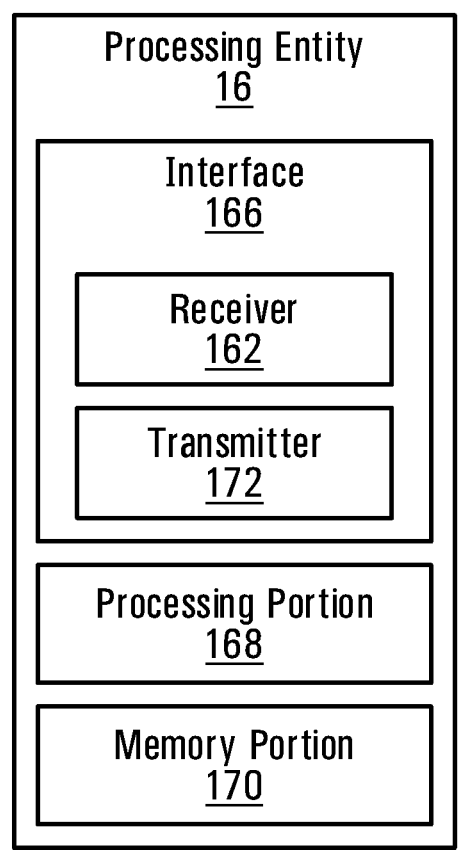
FIG. 23 shows an example of the processing entity of the control system.
Figure 24:
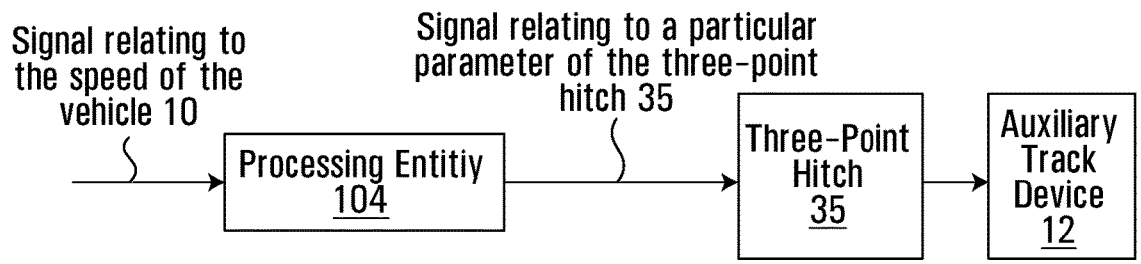
FIGS. 24 to 31 show examples of the processing entity of the control system controlling the auxiliary track device based various parameters, such as a speed of the vehicle, a direction of motion of the vehicle, a profile of the ground, and/or a compliance of the ground.
Figure 25:
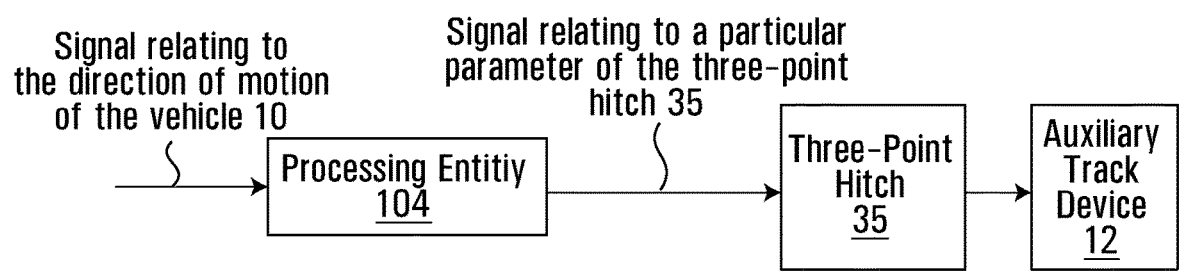
Figure 26:
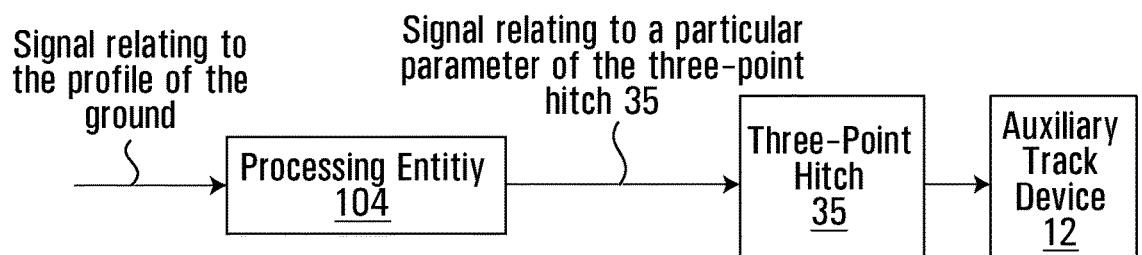
Figure 27:
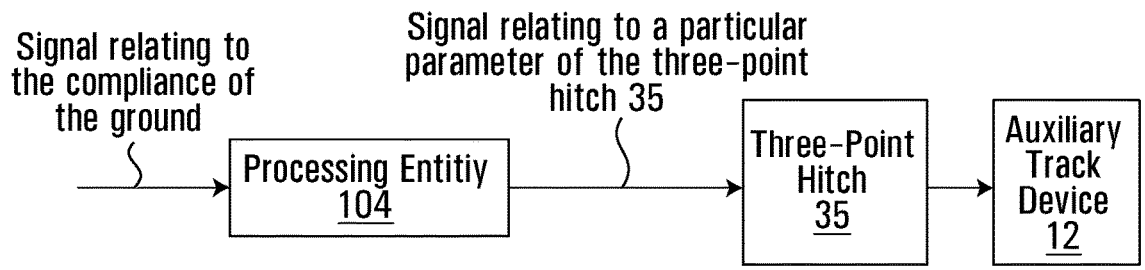
Figure 28:
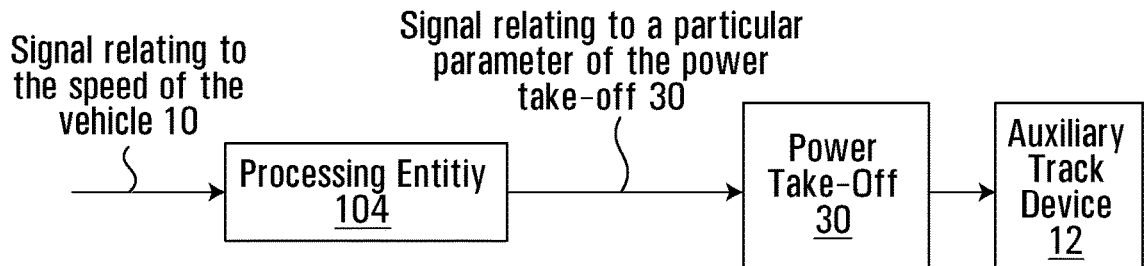
Figure 29:
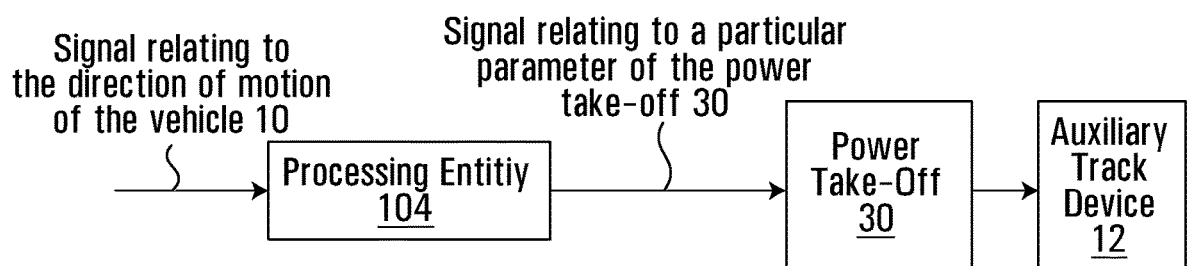
Figure 30:
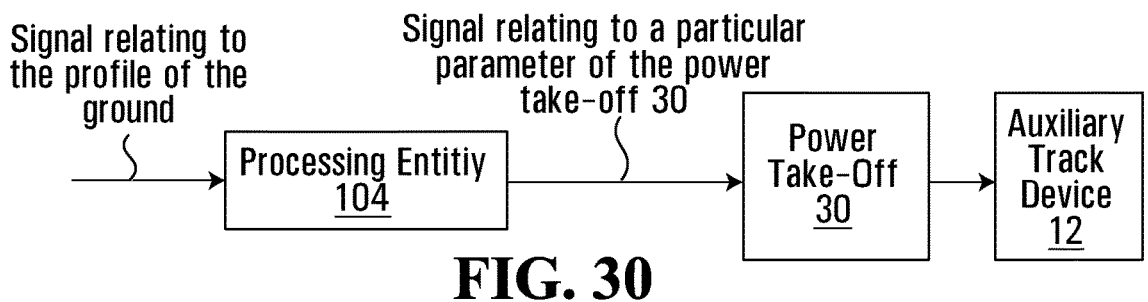
Figure 31:
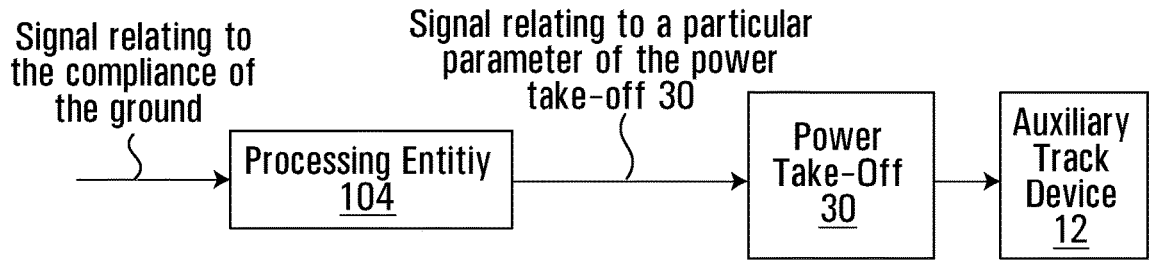

In this embodiment, as shown in FIG. 23, the processing entity 104 comprises an interface 166, a processing portion 168, and a memory portion 170, which are implemented by suitable hardware and software.

The interface 166 comprises one or more inputs and outputs allowing the processing entity 104 to receive input signals from and send output signals to other components to which the processing entity 104 is connected (i.e., directly or indirectly connected). For example, in some embodiments, an input of the interface 166 is implemented by a receiver 188 to receive a signal from the communication device 130, a given one of the sensors $84_1$-$84_s$, or another component. An output of the interface 166 is implemented by a transmitter 190 to transmit the ATDC commands to other components, such as the three-point hitch 35 and the power take-off 30 of the vehicle 10. In some embodiments, another output of the interface 166 may be implemented by a transmitter to transmit the interrogation signal to a given one of the sensors $84_1$-$84_s$, if applicable.

The processing portion 168 comprises one or more processors for performing processing operations that implement functionality of the processing entity 104. A processor of the processing portion 168 may be a general-purpose processor executing program code stored in the memory portion 170. Alternatively, a processor of the processing portion 168 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory portion 170 comprises one or more memories for storing program code executed by the processing portion 168 and/or data used during operation of the processing portion 168. A memory of the memory portion 170 may be a semiconductor medium (including, e.g., a solid-state memory), a magnetic storage medium, an optical storage medium, and/or any other suitable type of memory. A memory of the memory portion 170 may be read-only memory (ROM) and/or random-access memory (RAM), for example.

In some embodiments, the processing entity 104 may determine the ATDC commands based on information contained in the memory portion 170. For instance, the memory portion 170 may contain information associating different values of a parameter relating to the vehicle 10 with different values of a given parameter to be controlled in respect of the auxiliary track device 12. For example, in some embodiments, the memory portion 170 may associate different values of a given one of the speed of the vehicle 10, the direction of motion of the vehicle 10, the profile (e.g., the slope or steepness or the levelness) or the compliance of the ground, etc. with a particular value of a parameter (e.g., an angle) of the three-point hitch 35 or of a parameter (e.g., an power output level) of the power take-off 30 of the vehicle 10 for controlling the auxiliary track device 12. Thus, the processing entity 104 may consult its memory portion 170 in generating the ATDC commands.

In some embodiments, two or more elements of the processing entity 104 may be implemented by devices that are physically distinct from one another and may be connected to one another via a bus (e.g., one or more electrical conductors or any other suitable bus) or via a communication link which may be wired, wireless, or both. In other embodiments, two or more elements of the processing entity 104 may be implemented by a single integrated device.

The vehicle 10, including the track systems $16_1$,$16_2$, may be implemented in various other ways in other embodiments.

For instance, in other embodiments, the auxiliary track device 12 may always engage the ground as installed on the vehicle 10, i.e., the auxiliary track device 12 may not be selectively deployable onto and retractable from the ground.

In other embodiments, power may be provided to the auxiliary track device 12 in various other ways.

Figure 32A:
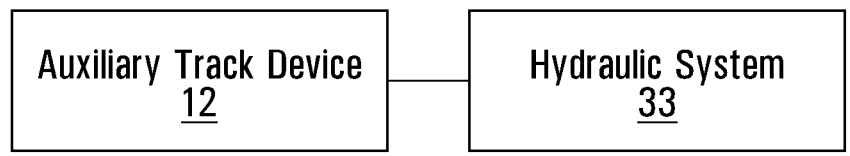
FIGS. 32A to 32C show an example of an embodiment of the auxiliary track device connected to a hydraulic system of the vehicle.
Figure 32B:
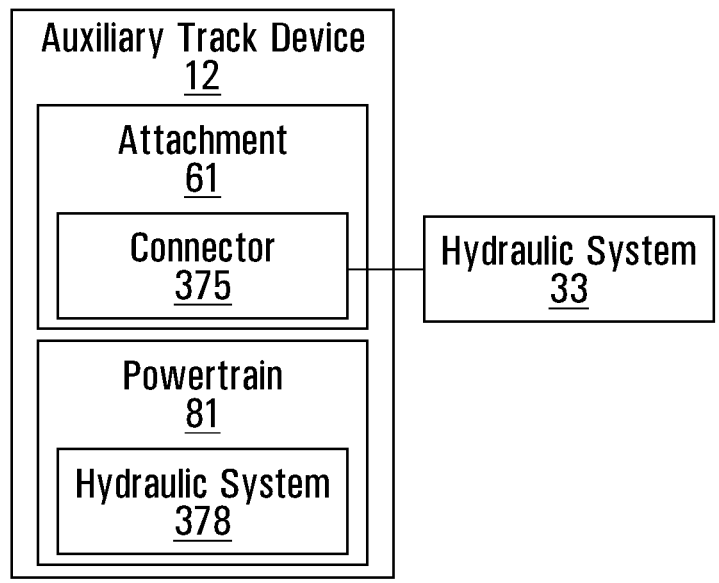
Figure 32C:
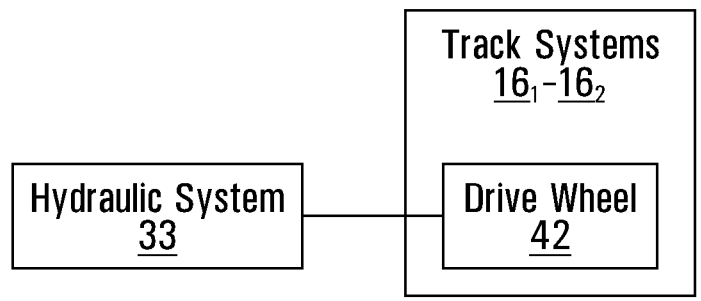

For example, in some embodiments, as shown in FIG. 32, the auxiliary track device 12 may be connectable to the hydraulic system 33 of the vehicle 10 to provide power to the auxiliary track device 12. The attachment 61 of the auxiliary track device 12 comprises a connector 375 connectable to the hydraulic system 33 (e.g., a hydraulic interface) of the vehicle 10, while the powertrain 81 of the auxiliary track device 12 comprises a hydraulic system 378 (e.g., a hydraulic line, a hydraulic motor, and/or other hydraulic machinery) to apply power from the hydraulic system 33 of the vehicle 10 to the drive wheel 42 of each of the track systems $16_1$, $16_2$.

Figure 33A:
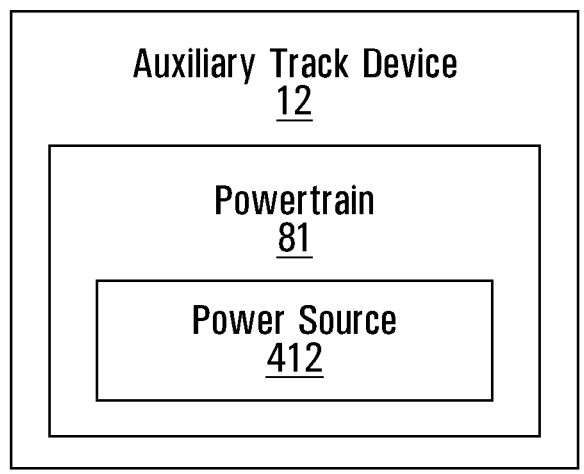
FIGS. 33A to 33C show an example of an embodiment of the auxiliary track device comprising a powertrain that includes a power source.
Figure 33B:
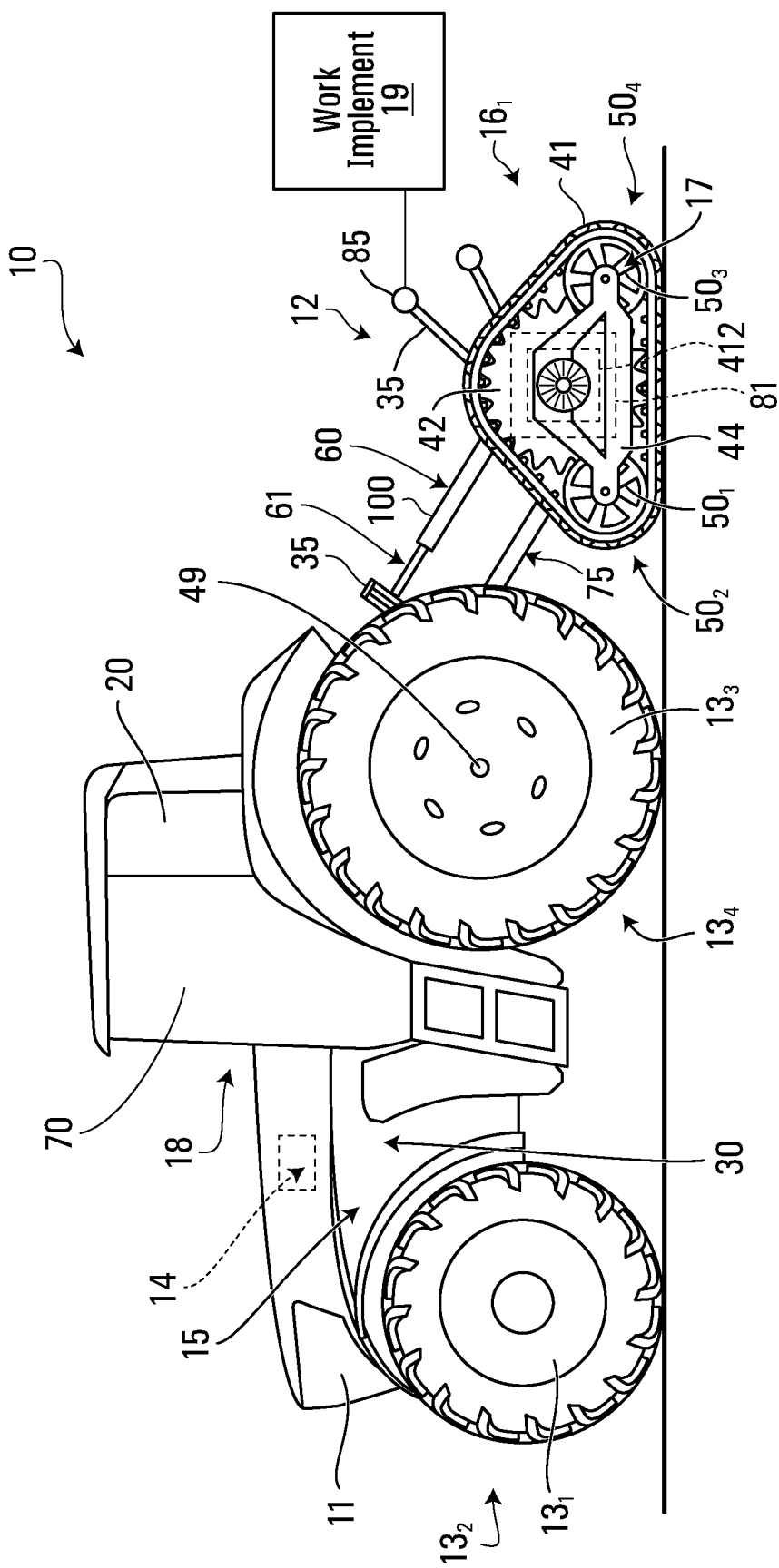
Figure 33C:
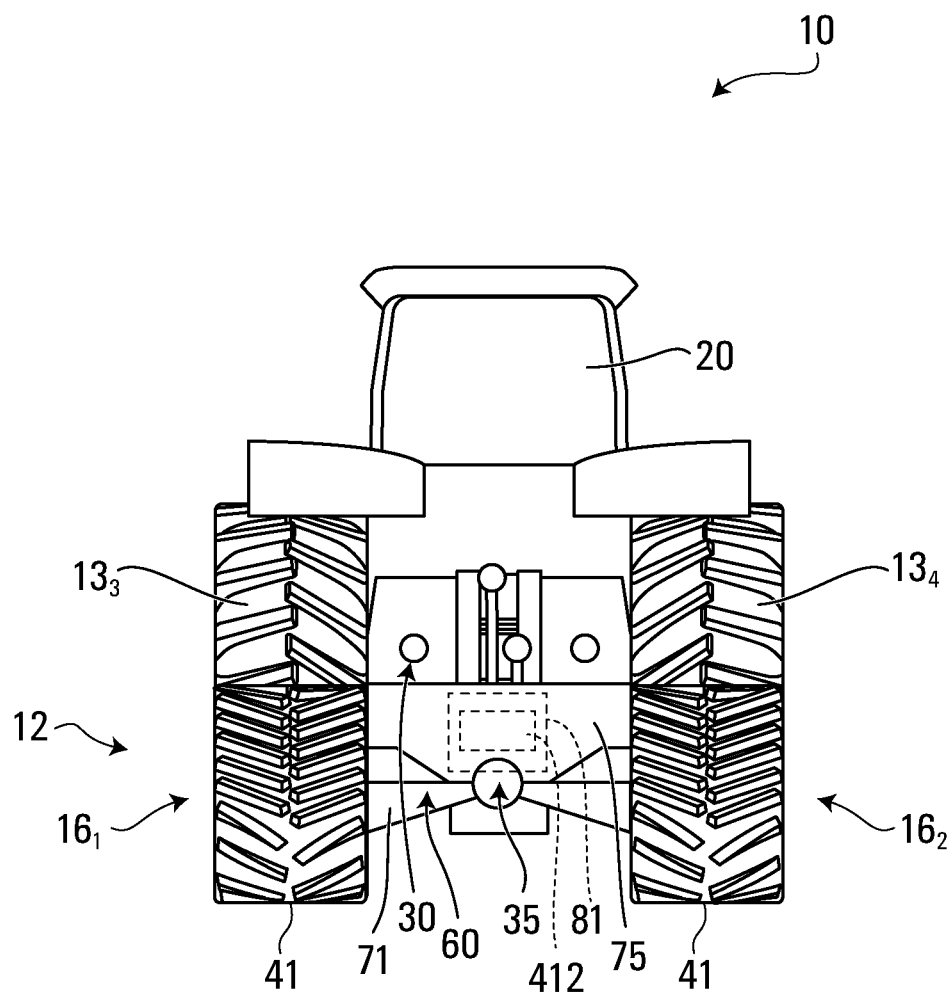

As another example, in some embodiments, as shown in FIG. 33, the powertrain 81 of the auxiliary track device 12 may comprise a power source 412 (e.g., a prime mover) to provide power to the auxiliary track device 12. The power source 412 of the auxiliary track device 12 is distinct from the power source 12 of the vehicle 10 and includes one or more motors. In other words, the auxiliary track device 12 may be self-sufficient. For instance, in some embodiments, the power source 412 may comprise an internal combustion engine, an electric motor, a hydraulic motor, or a combination of different types of motor (e.g., an internal combustion engine and an electric motor). Energy for the power source 412 may be provided by fuel, a battery, a generator (e.g., an electric generator connected to power take-off 30 of the vehicle 10), and/or any other suitable element. In some cases, the power source 412 of the auxiliary track device 12 may comprise a plurality of motors for providing power to respective ones of the track systems $16_1$, $16_2$. The powertrain 81 of the auxiliary track device 12 can transmit power from the power source 412 to the drive wheel 42 of each of the track systems $16_1$, $16_2$ (e.g., via a transmission, a differential, a direct connection, and/or any other suitable mechanism).

Figure 34A:
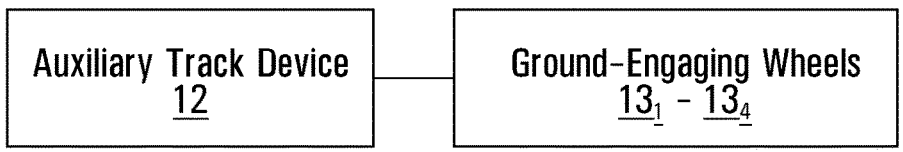
FIGS. 34A to 34C show an example of an embodiment in which the auxiliary track device is connected to ground-engaging wheels of the vehicle.
Figure 34B:
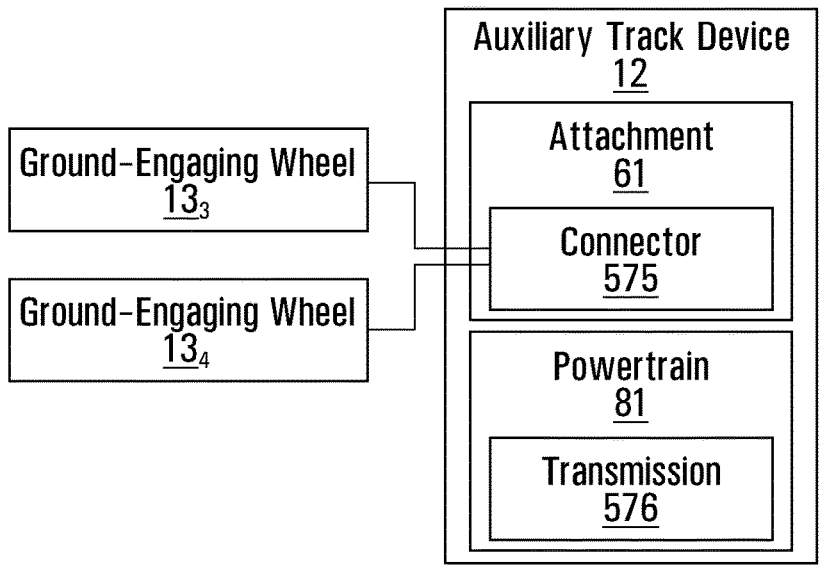
Figure 34C:
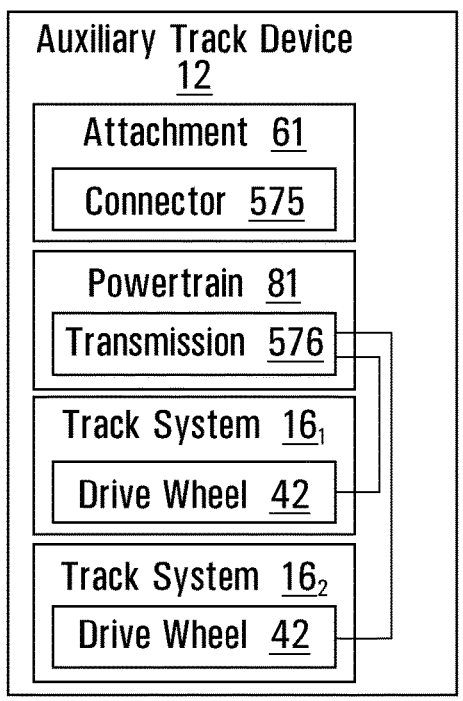
Figure 35:
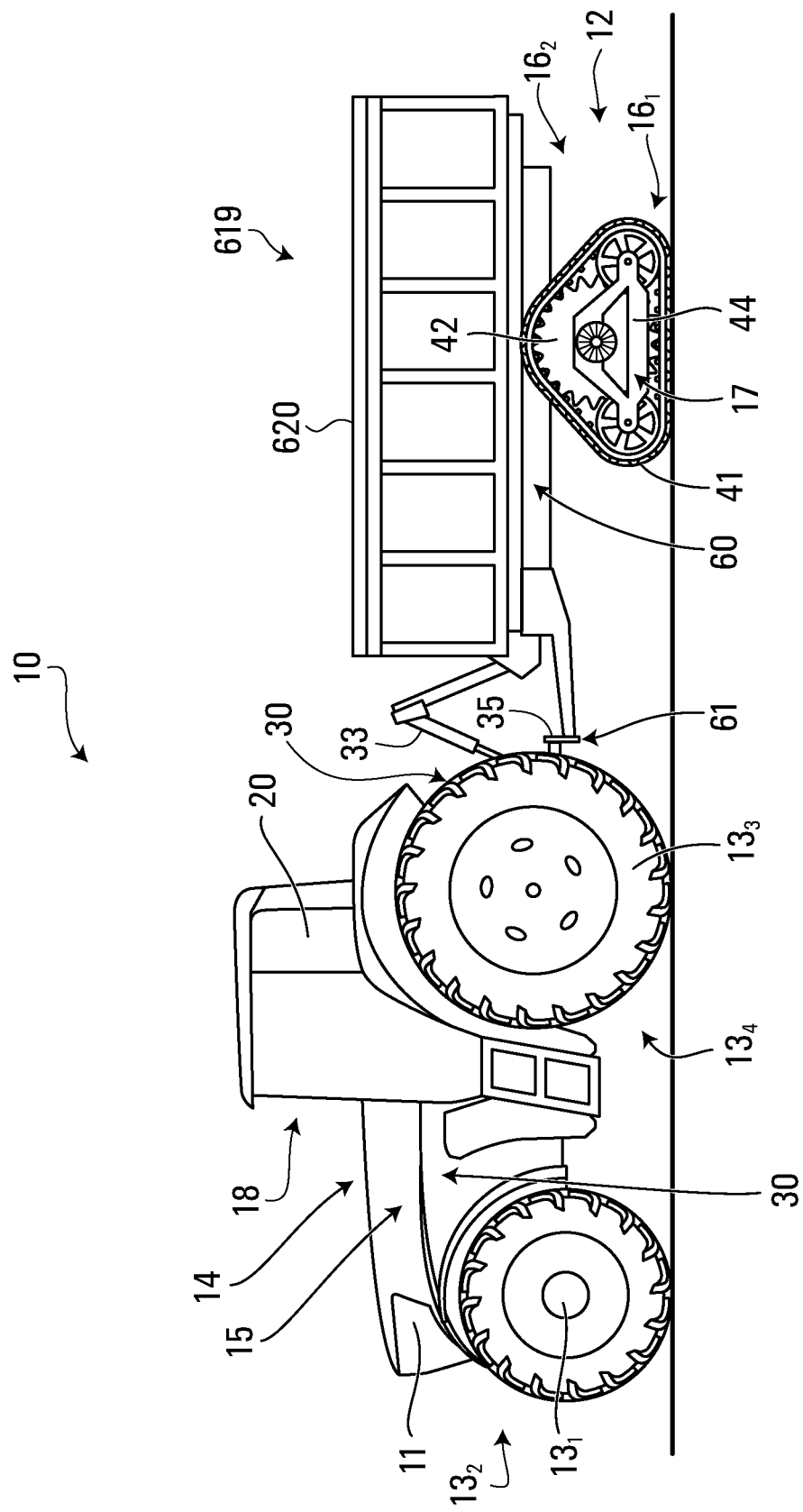
FIG. 35 shows an example of an embodiment in which an implement of the vehicle comprises a work element and the auxiliary track device.
Figure 36:
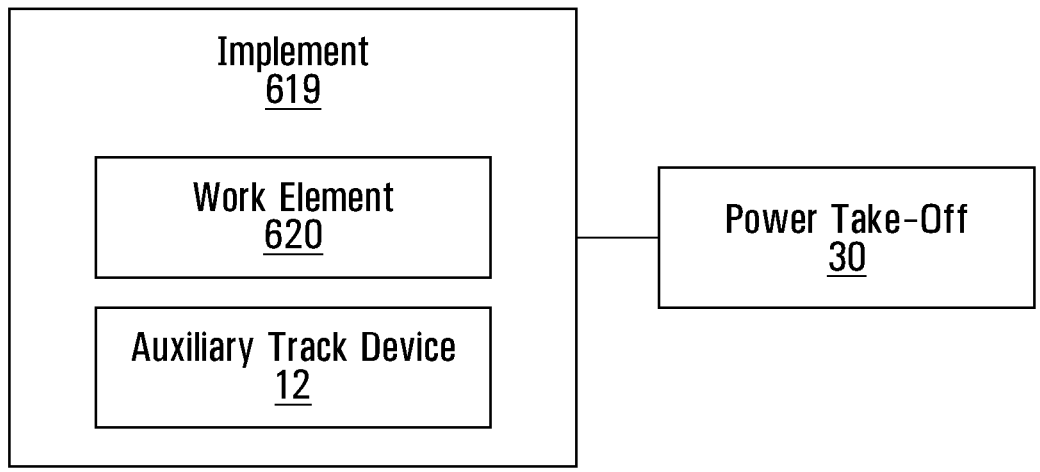
FIG. 36 shows an example of an embodiment in which the implement including the work element and the auxiliary track device is connected to a power take-off of the vehicle.
Figure 37:
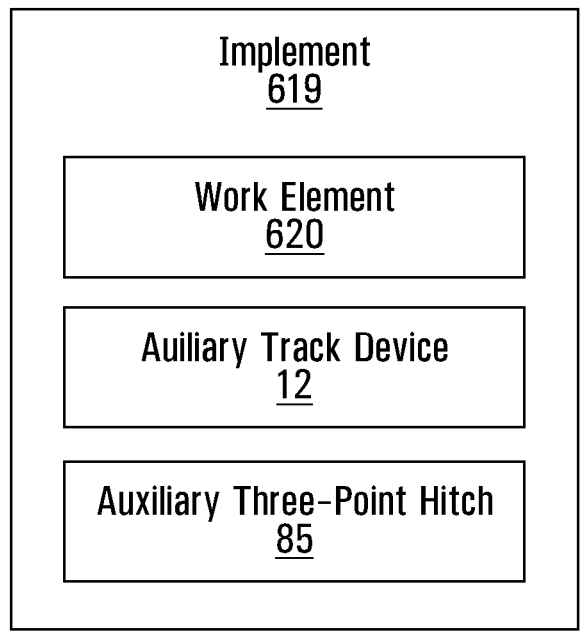
FIG. 37 shows an example of an embodiment in which the implement including the work element and the auxiliary track device comprises an auxiliary three-point hitch.
Figure 38:
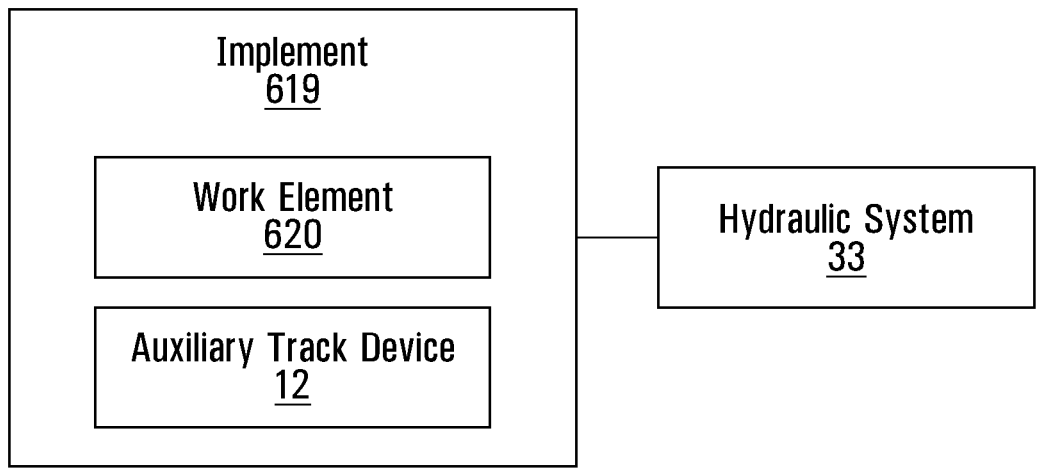
FIG. 38 shows an example of an embodiment in which the implement including the work element and the auxiliary track device is connected to a hydraulic system of the vehicle.
Figure 39A:
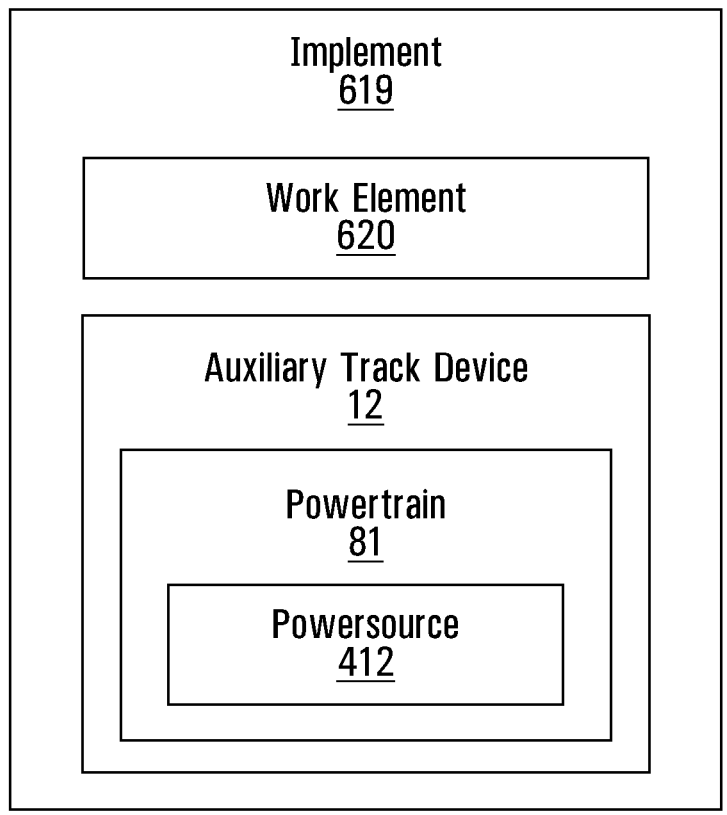
FIGS. 39A and 39B shows an example of an embodiment in which the implement including the work element and the auxiliary track device comprises a powertrain that includes a power source.
Figure 39B:
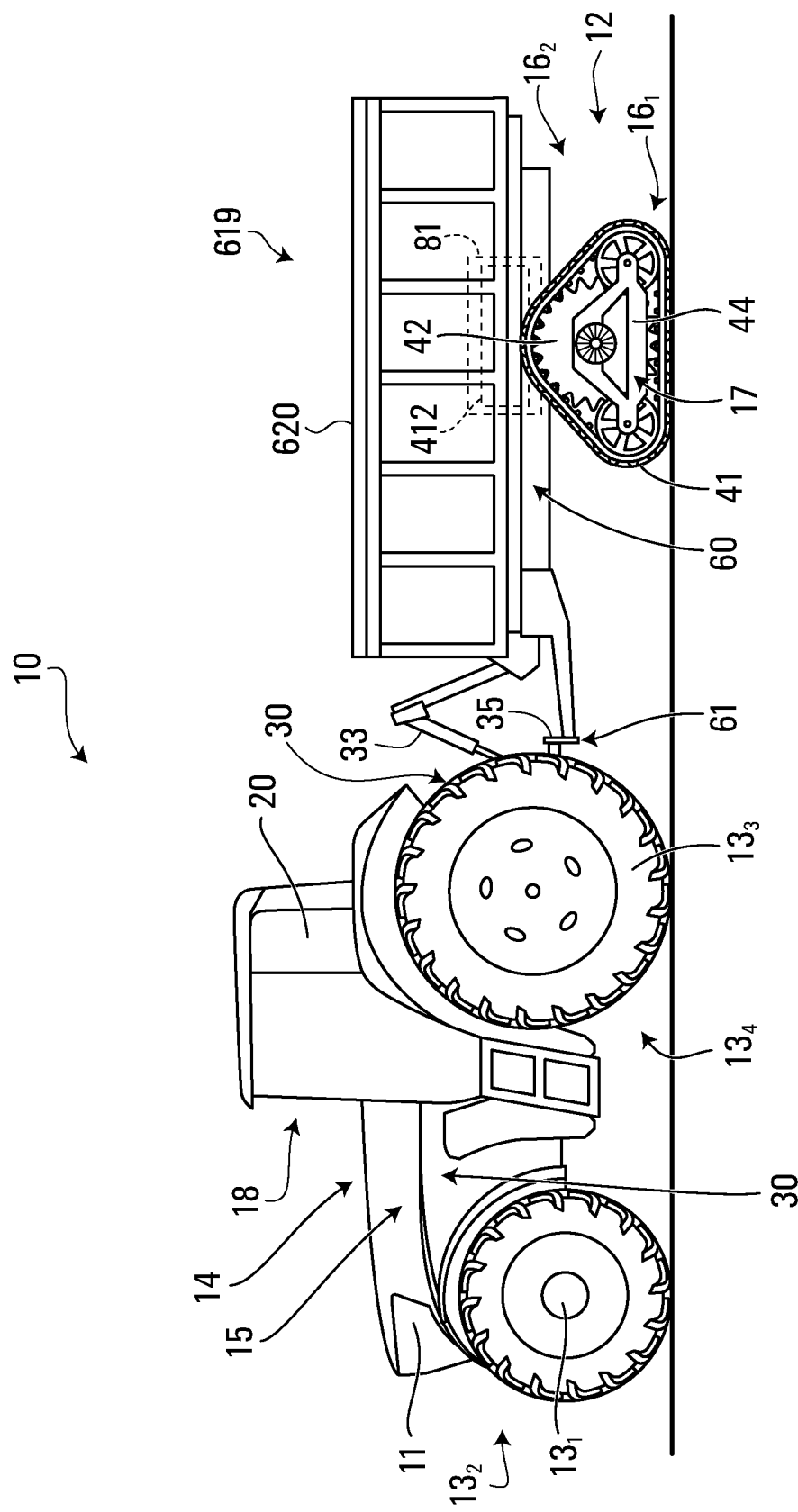

As yet another example, in some embodiments, as shown in FIG. 34, the auxiliary track device 12 may be connectable to the rear ones of the ground-engaging wheels $13_1$-$13_4$ of the vehicle 10 such that rotation of the rear ones of the ground-engaging wheels $13_1$-$13_4$ provides power to the auxiliary track device 12. The attachment 61 of the auxiliary track device 12 comprises a connector 575 connectable to each of the rear ones of the ground-engaging wheels $13_1$-$13_4$ (e.g., an axle of each of the rear ones of the ground-engaging wheels $13_1$-$13_4$), while the powertrain 81 of the auxiliary track device 12 comprises a transmission 576 to transmit power from rotation of the rear ones of the ground-engaging wheels $13_1$-$13_4$ to the drive wheel 42 of each of the track systems $16_1$, $16_2$.

In other embodiments, the auxiliary track device 12 may not be powered. That is, no power may be provided to the drive wheel 42 of each of the track systems $16_1$, $16_2$. Instead, the track 41 of each of the track systems $16_1$, $16_2$ may move around the track-engaging assembly 17 by virtue of movement of the vehicle 10 on the ground.

In other embodiments, the auxiliary track device 12 may be connectable to the vehicle 10 at any other suitable location. For example, in some embodiments, the auxiliary track device 12 may be connectable to the vehicle 10 such that the track systems $16_1$, $16_2$ are located ahead of front ones of the ground-engaging wheels $13_1$-$13_4$ of the vehicle 10. That is, at least part of each of the track systems $16_1$, $16_2$ may located ahead of the front ones of the ground-engaging wheels $13_1$-$13_4$ when the auxiliary track device 12 is connected to the vehicle 10.

Although in embodiments considered above the auxiliary track device 12 is used only for traction and/or floatation and is distinct and separate from the implement 19 of the vehicle 10, in other embodiments, as shown in FIGS. 35 to 40, the vehicle 10 may comprise an implement 619 that includes the auxiliary track device 12. That is, the auxiliary track device 12 is part of the implement 619 such that the support 60 of the auxiliary track device 12 is a support of the implement 619 which supports a work element 620 of the implement 619 and the track systems $16_1$, $16_2$ of the auxiliary track device 12 engage the ground beneath the implement 619 to provide traction and floatation to the implement 619. In this embodiment, the implement 19 is a trailed implement that is trailed behind the frame 11 of the vehicle 10.

The implement 619 may include a planter, a combine head, a sprayer, a fertilizer, a tiller, a grain cart, or any other type of agricultural work implement, and its work element 620 may include a planting head, a spraying head, a container, and/or any other type of work element that is used by the implement 619 to perform its work. In this embodiment, the implement 619 is a grain cart and its work element 620 includes a container.

In this embodiment, the implement 619 is connectable to the three-point hitch 35 of the vehicle 10, as discussed above in respect of the auxiliary track device 12, by the attachment 61.

Also, in this embodiment, the implement 619 is powered to enhance traction, as discussed above in respect of the auxiliary track device 12, by the powertrain 81 to provide power to the drive wheel 42 of each of the track systems $16_1$,$16_2$ to rotate the drive wheel 42 of that track system in order to move the track 41 of that track system. For example, in various embodiments, as discussed above, the drive wheel 42 of each of the track systems $16_1$,$16_2$ may be powerable by the auxiliary track device 12 being connectable to the power take-off 30 of the vehicle 10, being connectable to the hydraulic system 33 of the vehicle 10, comprising the power source 412, and/or being configured in any other suitable way to deliver power to the drive wheel 42 of each of the track systems $16_1$,$16_2$. Thus, in this embodiment, in addition to performing agricultural work via its work element 620, the implement 619 provides additional traction to the vehicle 10, compared to if only respective ones of the ground-engaging wheels $13_1$-$13_4$ were powered. The implement 619 is therefore self-propelled and helps for movement of the vehicle 10 on the ground.

While in embodiments considered above the vehicle 10 is an agricultural vehicle, in other embodiments, the vehicle 10 may be another industrial vehicle such as a construction vehicle (e.g., a loader, a telehandler, a bulldozer, an excavator, etc.) for performing construction work or a forestry vehicle (e.g., a feller-buncher, a tree chipper, a knuckleboom loader, etc.) for performing forestry work, a military vehicle (e.g., a military truck, etc.) for performing military work, an all-terrain vehicle (ATV), a snowmobile, or any other vehicle operable off paved roads. Although operable off paved roads, the vehicle 10 may also be operable on paved roads in some cases. Also, while in the embodiment considered above the vehicle 10 is driven by a human operator in the vehicle 10, in other embodiments, the vehicle 10 may be an unmanned ground vehicle (e.g., a teleoperated or autonomous unmanned ground vehicle).

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

Although various embodiments and examples have been presented, this was for purposes of description, but should not be limiting. Various modifications and enhancements will become apparent to those of ordinary skill in the art.

The invention claimed is:

1. An auxiliary track device for use with a vehicle comprising:
   a first track system and a second track system each comprising a track for engaging the ground and a track-engaging assembly for driving and guiding the track;
   a support for connecting the auxiliary track device to the vehicle and supporting the first track system and the second track system; and
   a powertrain configured to power a drive wheel of the track-engaging assembly of each of the first track system and the second track system;
   wherein the support of the auxiliary track device comprises an attachment configured to be connected to a three-point hitch of the vehicle;
   wherein the auxiliary track device is movable between a deployed position in which the auxiliary track device engages the ground and a retracted position in which the auxiliary track device is off the ground;
   wherein the auxiliary track device is configured to be automatically moveable between the deployed position and the retracted position by a control system based on one or more sensed parameters of the auxiliary track device; and
   wherein the one or more sensed parameters of the auxiliary track device comprise:
   a speed of the track of the first track system around the track-engaging assembly of the first track system;

a speed of the track of the second track system around the track-engaging assembly of the second track system;

a direction of motion of the track of the first track system around the track-engaging assembly of the first track system;

a direction of motion of the track of the second track system around the track-engaging assembly of the second track system;

a tension of the track of the first track system around the track-engaging assembly of the first track system; and/or a tension of the track of the second track system around the track-engaging assembly of the second track system.

2. The auxiliary track device of claim 1, wherein the powertrain of the auxiliary track device is configured to be connected to at least one of: a power take-off of the vehicle, a hydraulic system of the vehicle, and electrical power source of the vehicle, at least one rear wheel of the vehicle such that rotation of the at least one rear wheel provides power to the auxiliary track device, and a power source distinct from a power source of the vehicle.

3. The auxiliary track device of claim 1, further comprising an auxiliary three-point hitch configured to connect an implement to the auxiliary track device.

4. The auxiliary track device of claim 3, wherein the auxiliary three-point hitch comprises a plurality of arms connectable to the implement and a control mechanism configured to control the implement.

5. The auxiliary track device of claim 1, wherein the vehicle comprises an implement and the auxiliary track device is distinct and separate from the implement.

6. The auxiliary track device of claim 1, wherein the auxiliary track device is part of an implement for the vehicle; and the support of the auxiliary track device supports a work element of the implement.

7. The auxiliary track device of claim 1, wherein the attachment comprises a first attachment member extending generally horizontal to the ground and a second attachment member extending upwardly from and perpendicular to the first attachment member at or near a center of the first attachment member, wherein the first attachment member is configured to be pivotally coupled to the vehicle at a first link having an axis of rotation extending in a widthwise direction, and wherein the auxiliary track device is automatically rotatable relative to the vehicle about the axis of rotation of the first link to move between the deployed position and the retracted position.

8. The auxiliary track device of claim 1, wherein the support of the auxiliary track device further comprises a frame supporting the first track system and the second track system, wherein the frame of the auxiliary track device is configured to support a work element.

9. The auxiliary track device of claim 1, wherein the control system is configured to automatically control power supplied to the powertrain and/or the three-point hitch.

10. The auxiliary track device of claim 1, wherein the auxiliary track device is further configured to be automatically moveable between the deployed position and the retracted position by the control system based on one or more sensed parameters of the vehicle, wherein the one or more sensed parameters of the vehicle comprise at least one of:

a speed of the vehicle;
a direction of motion of the vehicle;
a speed of a motor of a power source of the vehicle;
a loading on the vehicle;
a compliance of a ground the vehicle is on;
a soil compatibility of the ground;
a profile of the ground;
a speed of motion of wheels or tracks on the vehicle;
a direction of motion of the wheels or the tracks of the vehicle;
a temperature of the tracks of the vehicle; a tension of the tracks of the vehicle; and
a slipperiness of the ground.

11. The auxiliary track device of claim 10, further comprising one or more sensors for sensing the one or more sensed parameters of the vehicle.

12. The auxiliary track device of claim 1, further comprising one or more sensors for sensing the one or more sensed parameters of the auxiliary track device.

13. The auxiliary track device of claim 1, wherein the first track system and the second track system are spaced apart in a widthwise direction and the powertrain or the power source of the auxiliary track device is positioned between the first track system and the second track system.

14. The auxiliary track device of claim 1, wherein the control system comprises:

a processing portion configured to receive the one or more sensed parameters of the vehicle and/or the one or more sensed parameters of the auxiliary track device, automatically generate and auxiliary track device command signal base on one or more sensed parameters of the vehicle and/or the one or more sensed parameters of the auxiliary track device, and transmit the ATDC signal to a power take-off of the vehicle and/or the three-point hitch; and a memory portion comprising one or more memories for storing program code executed by the processing portion and/or data used during operation of the processing portion and wherein the processing portion is further configured to generate the ATDC signal based on information containing in the memory portion.

15. An implement for a vehicle, the implement comprising:

a work element to perform work; and
an auxiliary track device comprising:
a first track system and a second track system each comprising a track for engaging the ground and a track-engaging assembly for driving and guiding the track;
a support for connecting the auxiliary track device to the vehicle and supporting the first track system, the second track system, and the work element; and
a powertrain configured to power a drive wheel of the track-engaging assembly of each of the first track system and the second track system;

wherein the auxiliary track device is movable between a deployed position in which the auxiliary track device engages the ground and a retracted position in which the auxiliary track device is off the ground;

wherein the auxiliary track device is configured to be automatically moveable between the deployed position and the retracted position by a control system based on one or more sensed parameters of the auxiliary track device; and wherein the one or more sensed parameters of the auxiliary track device comprise:

a speed of the track of the first track system around the track-engaging assembly of the first track system;
a direction of motion of the track of the first track system around the track-engaging assembly of the first track system;

a direction of motion of the track of the second track system around track-engaging assembly of the second track system;

a tension of the track of the first track system around the track-engaging assembly of the first track system; and/or a tension of the track of the second track system around the track-engaging assembly of the second track system.

16. The implement of claim 15, wherein the powertrain of the auxiliary track device is configured to be connected to a power take-off of the vehicle, a hydraulic system of the vehicle, an electrical power source of the vehicle, or at least one rear wheel of the vehicle such that rotation of the at least one rear wheel provides power to the auxiliary track device.

17. The implement of claim 15, wherein the auxiliary track device is further configured to be automatically moveable between the deployed position and the retracted position by the control system based on one or more sensed parameters of the vehicle, wherein the one or more sensed parameters of the vehicle comprises at least one of:

a direction of motion of the vehicle;

a speed of a motor of a power source of the vehicle;

a loading on the vehicle;

a compliance of a ground the vehicle is on;

a soil compatibility of the ground;

a profile of the ground;

a direction of motion of the wheels or the tracks of the vehicle;

a temperature of the tracks of the vehicle;

a tension of the tracks of the vehicle; and a speed of the vehicle.

18. The implement of claim 15, wherein the support of the auxiliary track device comprises an attachment configured to be connected to a three-point hitch of the vehicle, wherein the attachment is configured to be pivotally coupled to the vehicle at a first link having an axis of rotation extending in a width wise direction, and wherein the auxiliary track device is automatically rotatable relative to the vehicle about the axis of rotation of the first link to move between the deployed position and the retracted position.

\* \* \* \* \*

UNITED STATES PATENT AND TRADEMARK OFFICE
CERTIFICATE OF CORRECTION

PATENT NO. : 12,291,287 B2
APPLICATION NO. : 16/759706
DATED : May 6, 2025
INVENTOR(S) : Alain Lussier, Jeremie Zuchoski and Olivier Ravat Page 1 of 1

It is certified that error appears in the above-identified patent and that said Letters Patent is hereby corrected as shown below:

In the Claims

Beginning at Column 22, Line 64, the following text should be inserted --a speed of the track of the second track system around the track-engaging assembly of the second track system;--

Signed and Sealed this
Twenty-fourth Day of June, 2025

Coke Morgan Stewart
*Acting Director of the United States Patent and Trademark Office*